(12) United States Patent
Jain et al.

(10) Patent No.: US 11,032,618 B2
(45) Date of Patent: Jun. 8, 2021

(54) METHOD AND APPARATUS FOR PROCESSING CONTENT FROM PLURALITY OF EXTERNAL CONTENT SOURCES

(71) Applicant: Samsung Electronics Co., Ltd., Suwon-si (KR)

(72) Inventors: Arihant Jain, Noida (IN); Himanshu Gupta, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 171 days.

(21) Appl. No.: 15/889,021

(22) Filed: Feb. 5, 2018

(65) Prior Publication Data
US 2018/0227638 A1    Aug. 9, 2018

(30) Foreign Application Priority Data
Feb. 6, 2017    (IN) .............................. 201711004223

(51) Int. Cl.
| | |
|---|---|
| *H04N 21/482* | (2011.01) |
| *H04N 21/4363* | (2011.01) |
| *H04N 21/443* | (2011.01) |
| *H04N 21/84* | (2011.01) |
| *H04N 21/431* | (2011.01) |
| *H04N 21/462* | (2011.01) |

(52) U.S. Cl.
CPC ....... *H04N 21/482* (2013.01); *H04N 21/4314* (2013.01); *H04N 21/43635* (2013.01); *H04N 21/4438* (2013.01); *H04N 21/4622* (2013.01); *H04N 21/84* (2013.01)

(58) Field of Classification Search
CPC ............. H04N 21/482; H04N 21/4314; H04N 21/4622; H04N 21/84; H04N 21/43635; H04N 21/4438
See application file for complete search history.

(56) References Cited

U.S. PATENT DOCUMENTS

| | | |
|---|---|---|
| 8,166,504 B2 | 4/2012 | Kang et al. |
| 8,341,678 B1 | 12/2012 | Du Val |
| 2004/0244054 A1 | 12/2004 | Sheu et al. |
| 2006/0251389 A1* | 11/2006 | Kim ......................... H04N 5/91 |

(Continued)

FOREIGN PATENT DOCUMENTS

KR    10-0935352 B1    1/2010

OTHER PUBLICATIONS

ISA/KR, International Search Report and Written Opinion of the International Searching Authority for International Application No. PCT/KR2018/001559, dated Jun. 4, 2018, 18 pages.

(Continued)

*Primary Examiner* — Anthony Bantamoi

(57) ABSTRACT

The present disclosure relates to a method of processing content from a plurality of external content sources and a content processing device performing the method. Contents of the plurality of external content sources are analysed by an external content analyser, while one or more source modes of the content processing device are analysed by a source mode analyser. Accordingly, the contents of the plurality of external content sources are mapped by a content mapping engine to a content listing in the one or more source modes of the content processing device, based on at least one content parameter.

18 Claims, 29 Drawing Sheets

(56) References Cited

U.S. PATENT DOCUMENTS

| | | | |
|---|---|---|---|
| 2008/0106487 A1* | 5/2008 | Lee | H04N 5/44591 |
| | | | 345/1.1 |
| 2008/0189319 A1 | 8/2008 | Nielen et al. | |
| 2009/0094646 A1* | 4/2009 | Walter | H04N 7/17318 |
| | | | 725/48 |
| 2010/0333036 A1* | 12/2010 | Matsuyama | H04N 5/44543 |
| | | | 715/835 |
| 2011/0283320 A1* | 11/2011 | Levin | H04N 21/466 |
| | | | 725/40 |
| 2011/0289452 A1 | 11/2011 | Jordan et al. | |
| 2013/0276031 A1* | 10/2013 | Oh | H04N 21/431 |
| | | | 725/42 |
| 2013/0332831 A1 | 12/2013 | Birnkrant et al. | |
| 2014/0053212 A1 | 2/2014 | Shoykher et al. | |
| 2016/0142647 A1* | 5/2016 | Gopinath | G06F 16/783 |
| | | | 348/706 |

OTHER PUBLICATIONS

European Patent Office, "Supplementary European Search Report," Application No. EP 18748195.7, dated Aug. 21, 2019, 7 pages.

\* cited by examiner

External Content Analysis 1502
- Prepare List of external content stored in connected devices
  - USB/PC/Mobile/Tablet etc.
- Category/Genre of external content
  - Entertainment/Horror/Romantic/Action/Sports etc.

Source Mode Analysis 1504

- Broadcasting Mode
- Apps Mode
- Multi Screen Mode
- PIP Mode
- Etc.

- Least Viewed Channels
- Genre of current Mode
- Genre of Apps
- PIP
- Etc.

Automated Mapping & Streaming 1506
- Map External Content Genre to Current Mode Genre
- Map External Content to least viewed Channels
- Map External Content to Multimedia Apps
- Map External Content to PIP

METHOD AND APPARATUS FOR PROCESSING CONTENT FROM PLURALITY OF EXTERNAL CONTENT SOURCES

CROSS-REFERENCE TO RELATED APPLICATION

This application claims foreign priority to Indian Patent Application No. 201711004223, filed Feb. 6, 2017, the contents of which are incorporated herein by reference.

TECHNICAL FIELD

The present disclosure relates to content processing devices and methods for processing content from a plurality of external content sources.

BACKGROUND

Televisions (TVs) originally used to have only a broadcast mode for watching broadcast channels. However, nowadays television come with a number of other modes, such as a universal serial bus (USB) mode, high-definition multimedia interface (HDMI), Wi-Fi, Bluetooth, screen mirroring, digital living network alliance (DLNA), streaming, etc.

There is a need for a system where a user can access, in a single source, content present across multiple sources without the need to switch between the multiple sources, while simultaneously providing a seamless viewing experience.

SUMMARY

Aspects of the present disclosure are to address at least the above-mentioned problems and/or disadvantages and to provide at least the advantages described below. This summary is not intended to identify key or essential inventive concepts of the claimed subject matter, nor it is intended for determining the scope of the claimed subject matter. Accordingly, an aspect of the present disclosure is to provide a content processing device comprising: a content mapping engine configured to map contents of a plurality of external content sources to a content listing in one or more source modes of the content processing device based on at least one content parameter.

According to another aspect, the present disclosure provides a method, performed using a content processing device, the method comprising: mapping contents of a plurality of external content sources to a content listing in one or more source modes of the content processing device, based on at least one content parameter.

According to another aspect, the present disclosure provides a content processing device comprising: a user interface configured to present a content listing in a current source mode of the content processing device, the content listing comprising a mapping of contents of a plurality of external content sources to the content listing in the current source mode of the content processing device, and to receive a selection on one of the contents of the plurality of external content sources in the content listing; a content mapping engine configured to determine an external content source hosting the selected content; a source manager configured to automatically switch to the external content source from the current source mode; and a content player configured to play the selected content from the external content source.

According to another aspect, the present disclosure provides a method, performed using a content processing device, the method comprising: presenting a content listing in a current source mode of the content processing device, the content listing comprising mappings of contents of a plurality of external content sources to the content listing in the current source mode of the content processing device; receiving a selection on one of the contents of the plurality of external content sources in the content listing; determining an external content source hosting the selected content; automatically switching to the external content source from the current source mode; and playing the selected content from the external content source.

According to another aspect, the present disclosure provides a content processing device comprising: an external content analyser configured to analyse contents of a plurality of external content sources; a source mode analyser configured to analyse one or more source modes of the content processing device; a content mapping engine configured to map the contents of the plurality of external content sources to a content listing in the one or more source modes of the content processing device based on at least one content parameter; a user interface configured to: present a modified content listing of the one or more source modes, the modified listing having mappings of the contents of the plurality of external content sources to the content listing in the one or more source modes of the content processing device, and receive a selection of one of the contents of the plurality of external content sources in the content listing, wherein the content mapping engine is further configured to determine an external content source hosting the selected content; a source manager configured to automatically switch to the external content source; and a content player configured to play the selected content from the external content source.

According to another aspect, the present disclosure provides a method, performed using a content processing device, the method comprising: analysing contents of a plurality of external content sources; analysing one or more source modes of the content processing device; mapping contents of the plurality of external content sources to a content listing in the one or more source modes of the content processing device based on at least one content parameter; presenting a modified content listing of the one or more source modes, the modified listing having mappings of the contents of the plurality of external content sources to the content listing in the one or more source modes of the content processing device; receiving a selection of one of the contents of the plurality of external content sources in the content listing; determining an external content source hosting the selected content; automatically switching to the external content source; and playing the selected content from the external content source.

Other aspects, advantages, and salient features of the disclosure will be apparent to those of ordinary skill in the art from the following detailed description, which, taken in conjunction with the accompanying drawings, discloses various embodiments of the present disclosure. It will be understood that the following detailed description is explanatory only and is not restrictive of the inventive concept as claimed.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantage of certain embodiments of the present disclosure will be more apparent from the following description taken in conjunction with the accompanying drawings, in which:

FIG. 15 illustrates a high level flowchart in terms of aspects according to an exemplary embodiment of the present disclosure;

Throughout the drawings, like reference numerals will be understood to refer to like parts, components, and structures.

DETAILED DESCRIPTION

Figure 1:
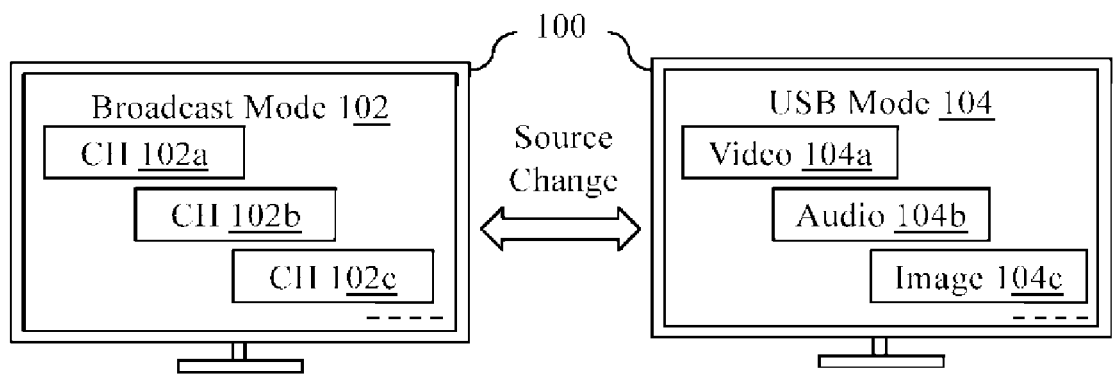
FIG. 1 illustrates switching from one source mode to another source mode.

FIGS. 1 through 27, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of embodiments of the present disclosure as defined by the claims and their equivalents. It includes various specific details to assist in that understanding, but these are to be regarded merely as examples. Accordingly, those of ordinary skill in the art will recognize that various changes and modifications of the example embodiments described herein can be made without departing from the scope of the present disclosure. In addition, descriptions of well-known functions and constructions may be omitted for clarity and conciseness.

As used in the present disclosure, terms such as "includes" or "may include" refer to the presence of the corresponding function, operation or feature, and do not limit the presence of additional functions, operations or features. Also, terms such as "includes" or "has" refer to the presence of characteristics, numbers, operations, operations, components or combinations thereof, and is not intended to exclude one or more additional characteristics, numbers, operations, operations, components or combinations thereof.

As used in the present disclosure, the term "or" is used to include any and all combinations of terms listed. For examples, "A or B" includes only A, only B, or both A and B.

As used in the present disclosure, terms such as "first" or "second" may be used to describe various features, but do not limit such features. For example, the terms do not limit the order and/or the importance of their associated features. Such terms may be used to differentiate one feature from another. For example, first user equipment (UE) and second UE are both user equipment, but are different user equipment. For example, without departing from the scope of the present disclosure, a first component may be referred to as a second component, and likewise, a second component may be referred to as a first component.

If a component is said to be "connected with" or "connected to" another component, the component may be directly connected with, or connected to, the other component, or another component may exist in between. On the other hand, if a component is said to be "directly connected with" or "directly connected to" another component, it should be understood that no components exist in between.

The term "module" as used herein indicates, for example, a unit including a combination of one or more of hardware, software, or firmware. The term "module" may be interchangeably used with the terms, for example, "unit," "logic," "logical block," "component," or "circuit." The "module" may be a minimum unit or part of the components integrally formed. The "module" may be a minimum unit or part of one or more functions. The "module" may be implemented mechanically or electronically. For example, the "module" may include at least one of an application-specific integrated circuit (ASIC), a field-programmable gate array (FPGA), or a programmable-logic device (PLD) for performing operations which are well known or will be developed.

Unless defined otherwise, all terms used herein have the same meaning as commonly understood by those of ordinary skill in the art. Such terms as those defined in a generally used dictionary are to be interpreted to have the same meanings as the contextual meanings in the relevant field of art, and are not to be interpreted to have ideal or excessively formal meanings unless clearly defined in the present specification.

A content processing device according to various example embodiments of the present disclosure can be a device including TV display functionality, for example, a device including a cathode ray tube (CRT), a digital light processing (DLP) display, a plasma display, a liquid crystal display (LCD) with or without thin-film-transistor (TFT), a light-emitting diode (LED) display, an organic light-emitting diode (OLED) display, or any other type of display. Other examples of the content processing device may include, but are not limited to, a set top box (STB), an electronic device having a TV tuner in hardware or software form, a smart-phone, a tablet personal computer (PC), a mobile phone, a video phone, an e-book reader, a desktop PC, a laptop PC, a netbook computer, a personal digital assistant (PDA), a portable multimedia player (PMP), etc. A content processing device according to various example embodiments of the present disclosure can be one or a combination of the above mentioned devices. The content processing device can be a flexible device.

Hereinafter, example embodiments of the present disclosure provide a content processing device and will be described by referring to the attached drawings. The term 'user' used in embodiments of the present disclosure may represent a person or a device (e.g., an artificial intelligence (AI) electronic device) who or which uses the content processing device.

FIG. 1 illustrates switching from one source mode to another source mode. For instance, a TV 100 can be first operated in a broadcast mode 102, switched to operate in a USB mode 104, and switched back to operate in the broadcast mode 102 again. Here, the broadcast mode 102 provides access to broadcast channels, CH 102*a*, CH 102*b*, CH 102*c*, and so on, while the USB mode 104 provides access to video 104*a*, audio 104*b*, image 104*c*, or any other type of files stored on a USB drive (not shown).

Figure 2:
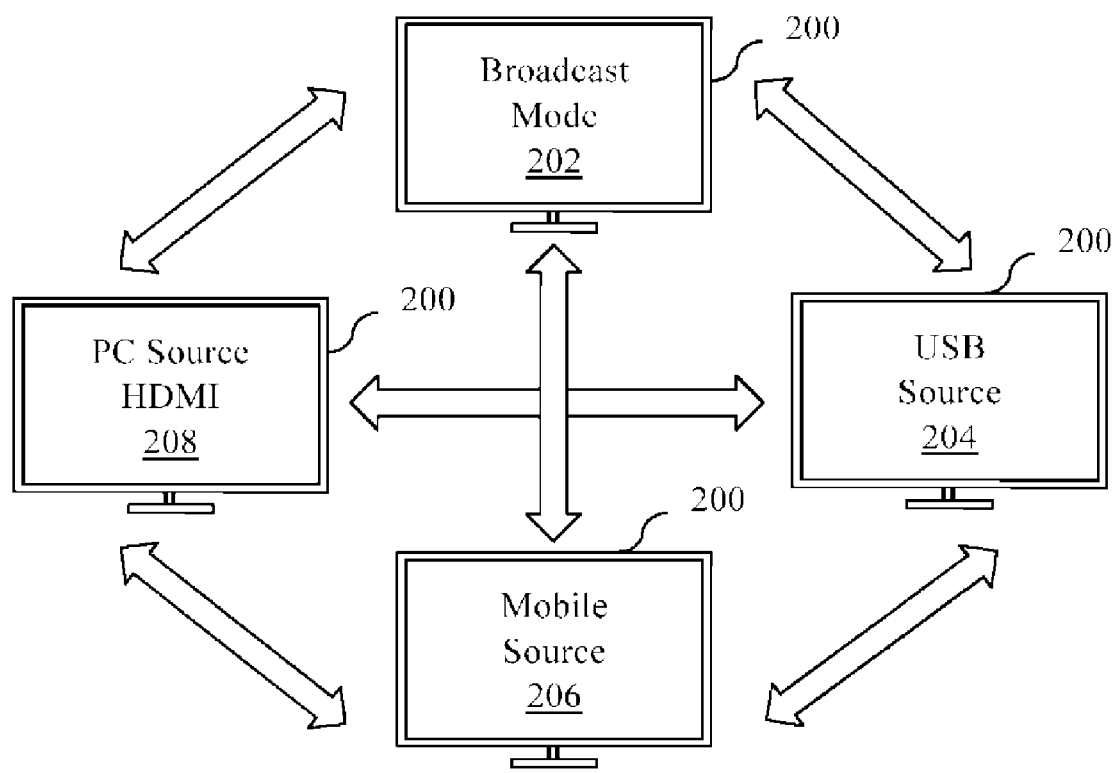
FIG. 2 illustrates switching between multiple source modes.

FIG. 2 illustrates switching between multiple source modes. As shown, a TV 200 may be capable of operating in more than two modes, such as a broadcast mode 202, USB source mode 204, a mobile source mode 206, and a personal computer (PC) source mode 208 through HDMI. The TV 200 can be switched from a current mode to operate in any other available mode.

Figure 3:
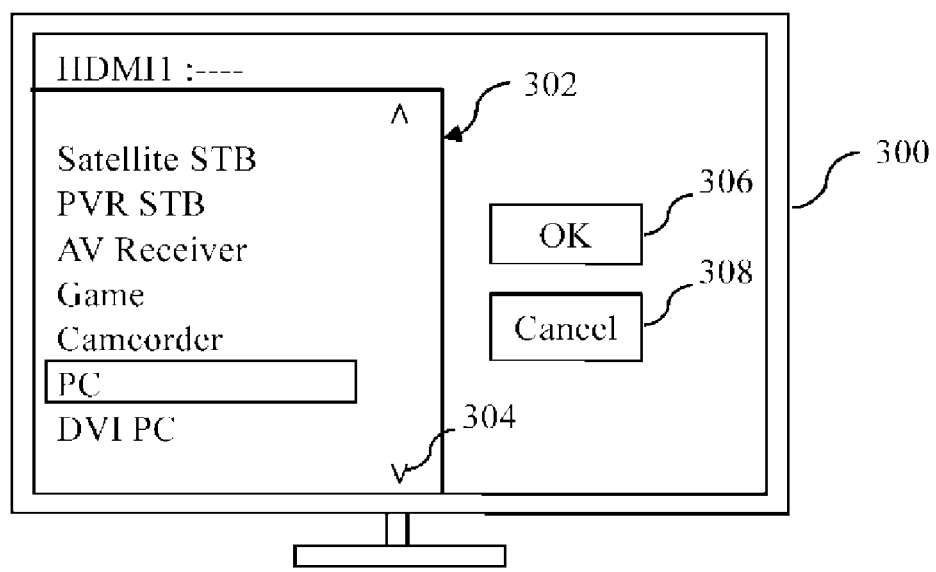
FIG. 3 illustrates a user interface for switching between multiple source modes.

FIG. 3 illustrates a user interface for switching between multiple source modes. As shown, a TV 300 may be capable of operating in multiple modes 302, such as HDMI, Satellite set-top box (STB), personal video recorder (PVR) STB, audio-video (AV) Receiver, game, camcorder, PC, digital visual interface (DVI) PC, etc. A user can switch the TV 300 from one mode to operate in another mode. A basic user interface is shown in FIG. 3 for selecting a desired mode, such as PC, with the help of graphical user interface (GUI) elements, such as navigation arrows 304, an 'Ok' button 306, a 'Cancel' button 308, etc.

In the above described scenarios, a user can watch content in one mode, but to watch another content in a second mode, the user has to manually switch his TV to operate in the second mode. For example, in the broadcast mode, a user can only watch broadcast channels, but not movies stored in an external hard disk like a USB drive. In order to watch movies stored in the USB drive, the user has to switch his TV from the broadcast mode to operate in the USB mode. So a problem with the methods is that one can play content only from one source in a current source mode. If any external device is connected to a TV, users switch the TV to operate in a corresponding source mode to be able to browse the content present in the external device. A TV can be enabled to receive content from personalized web channels with the help of a local PC. Additionally, content available in a home network can be allocated to an empty TV channel.

Figure 4:
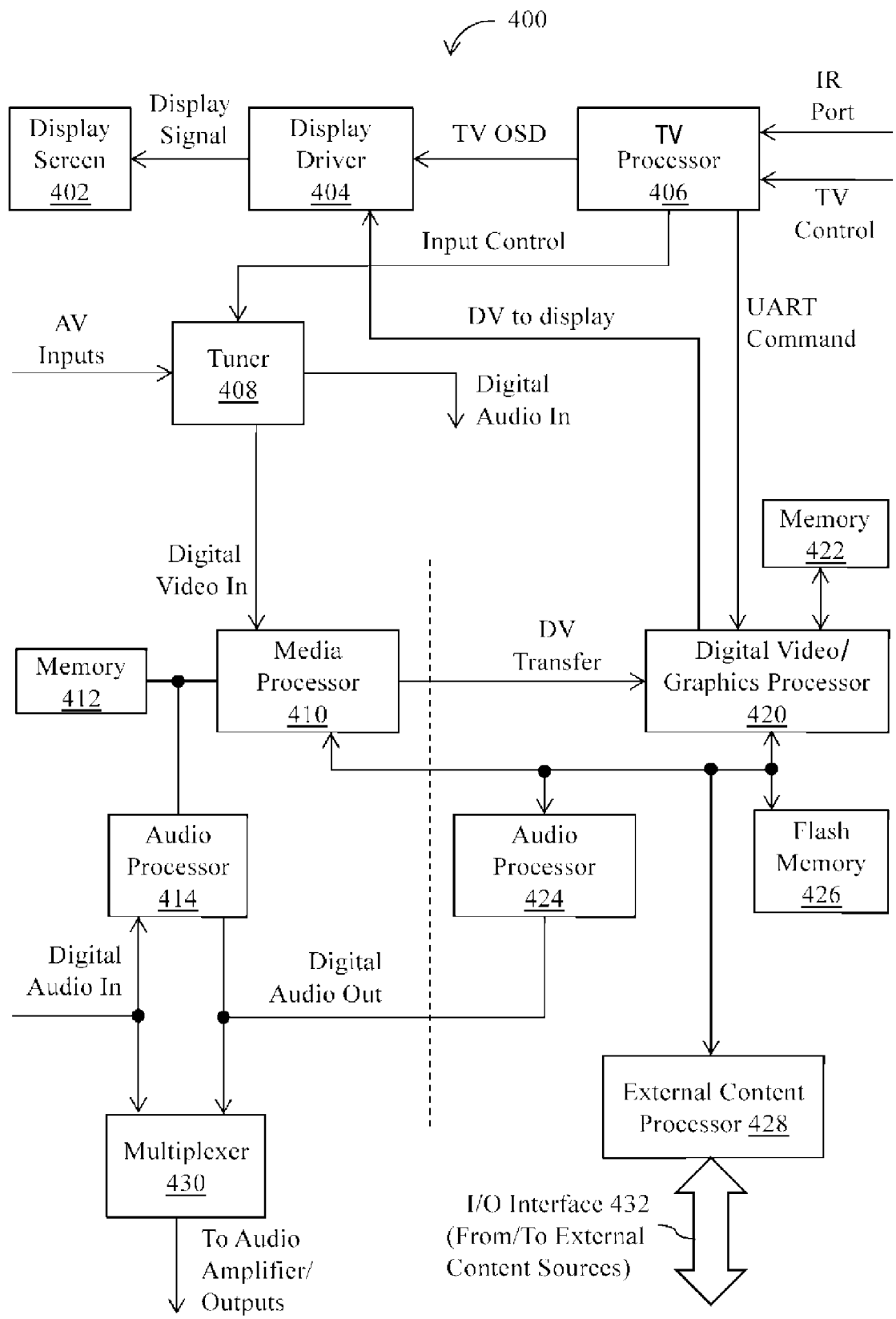
FIG. 4 illustrates a block diagram of a content processing device, according to exemplary embodiments of the present disclosure.

FIG. 4 illustrates a block diagram of a content processing device 400, according to exemplary embodiments of the present disclosure.

The content processing device 400 contains a display screen 402 configured to display visual output to a viewer based on a display signal generated by a display driver 404. The display driver 404 accepts a primary digital video signal from a digital video/graphics processor 420.

A TV processor 406 provides basic control functions and viewer input interfaces for facilitating TV functionality of the content processing device 400. The TV processor 406 receives viewer commands, both from TV control buttons located on the content processing device 400 and/or from a handheld remote control unit through an infrared (IR) port. Based on the viewer commands, the TV processor 406 controls a tuner 408. The tuner 408 can be an analog tuner or a digital tuner. The TV processor 406 also supplies user inputs to the digital video/graphics processor 420 over a universal asynchronous receiver/transmitter (UART) command channel or a different kind of communication channel. The TV processor 406 is also capable of generating basic on-screen display (OSD) graphics, for example, indicating which input is selected, a current audio volume setting, etc. The TV processor 406 supplies these OSD graphics as a TV OSD signal to the display driver 404 for overlaying on the display signal.

The tuner 408 allows the content processing device 400 to switch between various analog or digital inputs for both video and audio. The video inputs can include a radio frequency (RF) signal carrying broadcast TV, digital TV, and/or high-definition TV signals, NTSC video, S-Video, and/or RGB component video inputs, although various embodiments may not accept each of these signal types or may accept signals in other formats (such as PAL). The selected video input is converted to a digital data stream 'Digital Video In' and is supplied to a media processor 410.

The tuner 408 also selects an audio source, digitizes that source if necessary, and supplies that digitized source as 'Digital Audio In' to an audio processor 414 and a multiplexer 430. The audio source can be selected, independently of the current video source, as the audio channel(s) of a currently tuned RF TV signal, stereophonic or monophonic audio connected to the content processing device 400 by audio jacks corresponding to a video input, or an internal microphone. In one implementation, the tuner 408 may also work as a source manager to select a source mode for the content processing device 400 or switch from one source mode to another.

The media processor 410 and the digital video/graphics processor 420 provide various digital feature capabilities of the content processing device 400, as will be described further in relation to exemplary embodiments below. The digital video/graphics processor 420 functions as a master processor, and the media processor 410 functions as a slave processor. The media processor 410 supplies digital video, either corresponding to 'Digital Video In' or to a decoded media stream from another source, such as an external content source, to the digital video/graphics processor 420 over a digital video (DV) transfer bus.

The media processor 410 performs MPEG (Motion Picture Expert Group) coding and decoding of digital media streams for the content processing device 400, as instructed by the digital video/graphics processor 420. A data bus connects a memory 412 to the media processor 410. The audio processor 414 also connects to this data bus to provide audio coding and decoding for media streams handled by the media processor 410.

The digital video/graphics processor 420 coordinates (and/or implements) many of the digital features of the content processing device 400. A data bus connects a memory 422 to the digital video/graphics processor 420. A system bus connects the digital video/graphics processor 420 to the media processor 410, an audio processor 424, a flash memory 426, and an external content processor 428. The flash memory 426 stores boot code, configuration data, executable code, and Java code for graphics applications, etc.

The external content processor 428 is the component primarily responsible for implementing the present disclosure. The function and sub-components of the external content processor 428 is described in detail in conjunction with FIG. 5. Those of ordinary skill in the art will appreciate that the external content processor 428 may not need to be implemented as a separate component. The functionality of the external content processor 428 may be implemented by using one or more other components of the content processing device 400. In one example, the functionality of the external content processor 428 may be implemented by the media processor 410, or the digital video/graphics processor 420, or a combination of both or in combination with any other component of the content processing device 400. Once content is discovered, interpreted, and read into an appropriate screen format, the external content processor 428, on screen display (OSD) of the content is operated by the processor 420/410 to display the content properly.

The external content processor 428 receives external content from one or more external sources via an Input/Output (IO) interface 432. The IO interface 432 can be wired or wireless interface to communicate audio-video or data signals. Examples of the IO interface include, but are not limited to universal serial bus (USB), high definition multimedia interface (HDMI), local area network (LAN)/Ethernet, Bluetooth, IR, near-field communication (NFC), wireless local area network (WLAN), Wi-Fi, super (S)-video, component inputs (red, green, and blue cables), audio video also known as Radio Corporation of America (RCA) connector or as Composite (yellow, white and red inputs), video graphics array (VGA) for PC, digital visual interface (DVI), radio frequency (RF) connector stereo/composite video, optical disk (CD, DVD, Blu-ray, etc.), optical port also known as toslink, digital or analog coaxial, PC cards such as Personal Computer Memory Card International Association (PCMCIA), etc.

The external content processor 428 via the IO interface 432 can provide extended media and/or application capability. The digital video/graphics processor 420 can pass data from the DV transfer bus to the display driver 404 as is, but the processor 420 can also supersede, modify, or superimpose the DV transfer signal with information received from the external content processor 428.

The multiplexer 430 provides audio output to the TV amplifier and line outputs (not shown) from one of first to third sources. The first source is the current Digital Audio In stream from the tuner 408. The second and third sources are the Digital Audio Outputs of the audio processors 414 and 424. These two outputs are tied to the same input of the multiplexer 430, since each audio processor is capable of tri-stating its output when it is not selected.

The names of the components of the content processing device 400 may differ according to the type of the content processing device 400. The content processing device 400 may include one or more of the components, omit some components, or further include other components according to its type.

Figure 5:
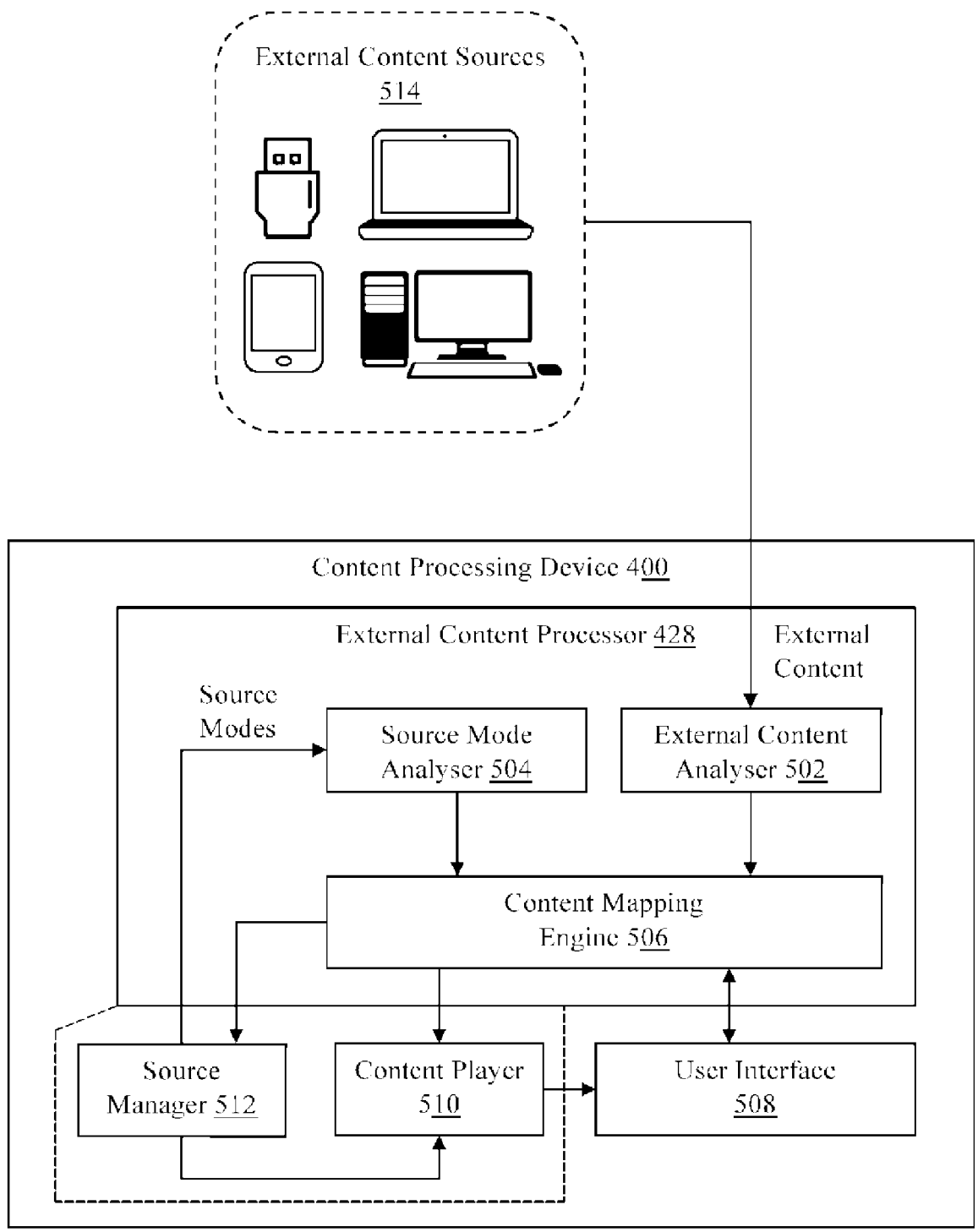
FIG. 5 illustrates another block diagram of the content processing device, according to exemplary embodiments of the present disclosure.

FIG. 5 illustrates another block diagram of the content processing device 400, according to exemplary embodiments of the present disclosure.

As shown, the content processing device 400 comprises the external content processor, or simply put, a processor 428 configured to process content of external content sources 514. The external content processor 428 further comprises and controls an external content analyser 502 to analyse external content, a source mode analyser 504 to analyse source modes of the content processing device 400, and a content mapping engine 506 to map external contents to a content listing in the source modes based on at least one content parameter. In one implementation, the functionality of the source mode analyser 504 may be split between multiple modules (not shown), for example, a broadcast channel analyser module, an app analyser module, a multi-screen/picture in picture (PIP) analyser module, and so on.

The present disclosure is not limited to the above mentioned features of above mentioned components and modules. This present disclosure can be implemented using any combination of the above mentioned components and modules or may be extended to other devices which support multimedia content playback. Also, the present disclosure is applicable to any kind of content supported for playback and present on paired devices or connected devices. The present disclosure aims to provide a solution with respect to multiple sources, for content processing devices, such as smart TVs, where one can play only single content at a time due to a single source being supported on single screen mode.

The content processing device 400 further comprises a user interface 508 configured to present/display a modified content listing having mappings of external contents. In one implementation, at least the display screen 402, the display driver 404, and the TV processor 406 shown in FIG. 4 together form a part of the user interface 508 shown in FIG. 5. The user interface 508 may also include some more components from FIG. 4, for example, audio output related components can also be part of the user interface 508. When a user selection is received in the modified content listing presented in the user interface 508, corresponding external content source is identified by the content mapping engine 506.

The content processing device 400 further comprises a source manager 512 to provide information of source modes to the source mode analyser 504 and to switch to the identified external content source hosting the selected content. In one implementation, at least the tuner 408 shown in FIG. 4 forms a part of the source manager 512 shown in FIG. 5.

The content processing device 400 further comprises a content player 510 configured to play or smartly stream the selected content from the identified external content source. In one implementation, the content player 510 may be provided in the flash memory 426 shown in FIG. 4. The external content processor 428 may be further implemented to comprise and control the source manager 512 and the content player 510. The content player 510 can be an image viewer client, an audio player, a video player, an address book content display client, an email client, a web page display client, etc. The image viewer client operates as a photo browser for the content processing device 400. This is a user application which allows a user to select a slideshow, select music to go with the slide show, select an album, pause, play, stop and resume. User interfaces may vary. The audio player client operates as an audio browser for the content processing device 400. This is a user application that allows the user to select music, view/select from a playlist of content, and read about a singer and/or album, group, etc. The player allows a user to pause, play, stop, resume, fast forward, rewind in response to user actions received through a remote control or the IO interface 432. The video player operates as a video browser for the content processing device 400. This user application allows a user to select video, view a playlist, pause, resume, jump to live, fast-forward, rewind, stop and play in response to user actions received by the remote control or the IO interface 432. The address book content display client operates as an address content book browser. The application interface allows a user to add, edit, remove, and view stored content through the remote control or the IO interface 432. This address book may interface and be compatible with known address books in ways known by those of ordinary skill in the art. The email/webpage display client operates as an email and webpage browser. The application allows users to view and write emails and display webpages. Content for these can be obtained from a remotely connected commuting device. Operation of the email and web browser client can be effected by using a keyboard interface to the TV and/or remote control with qwerty (keys) associated with the number pad.

According to an exemplary embodiment of mapping external contents, the present disclosure provides the content processing device 400 comprising: the content mapping engine 506 configured to map contents of the plurality of external content sources 514 to a content listing in one or more source modes of the content processing device 400 based on at least one content parameter. Here, the at least one content parameter comprises at least one of a genre, metadata, information derived from the metadata, size, category, type, etc. of the contents, while the content listing comprises at least one of an electronic program guide (EPG), an interactive program guide (IPG), a TV guide, a browsing menu, a TV menu, etc.

The content processing device 400 may further comprise the external content analyser 502 to analyse the contents of the plurality of external content sources 514. Here, the plurality of external content sources 514 comprises two or more of a USB device, a HDMI device, a mobile device, a tablet device, a PC, a laptop, a storage device, a wirelessly connected device, a set top box, a broadcasting system, etc.

The content processing device 400 may further comprise the source mode analyser 504 to analyse the one or more source modes of the content processing device 400. The one or more source modes comprises one or more of a broadcasting mode, an application mode, a multi-screen mode, and a picture in picture (PIP) mode. The content mapping engine 506 may be further configured to map one external source to one of a channel in the broadcasting mode, an application in the application mode, a screen in the multi-screen mode, and a PIP window in the PIP mode.

The source mode analyser 504 may be further configured to identify unused or least viewed channels when the content processing device 400 is in the broadcasting mode, wherein the content mapping engine 506 may be further configured to map the contents of the plurality of external content sources 514 to the unused or least viewed channels within the content listing based on the at least one content parameter.

The source mode analyser 504 may be further configured to identify multimedia applications or widgets when the content processing device 400 is in the application mode, wherein the content mapping engine 506 is further configured to map the contents of the plurality of external content sources 514 to the identified multimedia applications or widgets within the content listing based on the at least one content parameter.

The source mode analyser 504 may be further configured to identify at least one screen when the content processing device 400 is in the multi-screen mode, wherein the content mapping engine 506 is further configured to map the contents of the plurality of external content sources 514 to the at least one screen in the multi-screen mode based on the at least one content parameter.

The source mode analyser 504 may be further configured to identify at least one PIP window when the content processing device 400 is in the PIP mode, wherein the content mapping engine 506 is further configured to map the contents of the plurality of external content sources 514 to the at least one PIP window in the PIP mode based on the at least one content parameter.

The content processing device 400 may further comprise the user interface 508 configured to present a modified content listing of the one or more source modes, the modified listing having mappings of the contents of the plurality of external content sources 514 to the content listing in the one or more source modes of the content processing device 400. The modified content listing is generated by performing at least one of adding of new content in the content listing, replacing of least viewed content from the content listing with new content, appending of new content in the content listing, and replacing of unavailable content from the content listing with new content. The user interface 508 presents the modified content listing in a smart view listing of all the contents of the plurality of external content sources 514 in a single view such that content can be selected from an external content source without explicitly switching to the external content source.

According to another exemplary embodiment of selection of mapped external contents, the present disclosure provides the content processing device 400 comprising: the user interface 508 configured to present a content listing in a current source mode of the content processing device 400, the content listing comprising mapping of contents of the plurality of external content sources 514 to the content listing in the current source mode of the content processing device 400, and to receive a selection of one of the contents of the plurality of external content sources 514 in the content listing; the content mapping engine 506 configured to determine an external content source hosting the selected content; the source manager 512 to automatically switch to the external content source 514 from the current source mode; and the content player 510 configured to play the selected content from the external content source 514. The selected content is streamed from the external content source 514 in the current source mode of the content processing device 400.

According to another exemplary embodiment of mapping external contents and subsequent selection of mapped external contents, the present disclosure provides the content processing device 400 comprising: the external content analyser 502 configured to analyse contents of the plurality of external content sources 514; the source mode analyser 504 configured to analyse one or more source modes of the content processing device 400; the content mapping engine 506 configured to map the contents of the plurality of external content sources 514 to a content listing in the one or more source modes of the content processing device 400 based on at least one content parameter: the user interface 508 configured to: present a modified content listing of the one or more source modes, the modified listing having mappings of the contents of the plurality of external content sources 514 to the content listing in the one or more source modes of the content processing device 400, and receive a selection on one of the contents of the plurality of external content sources 514 in the content listing, wherein the content mapping engine 506 is configured to determine an external content source hosting the selected content: the source manager 512 configured to automatically switch to the external content source; and the content player 510 configured to play the selected content from the external content source.

Figure 6:
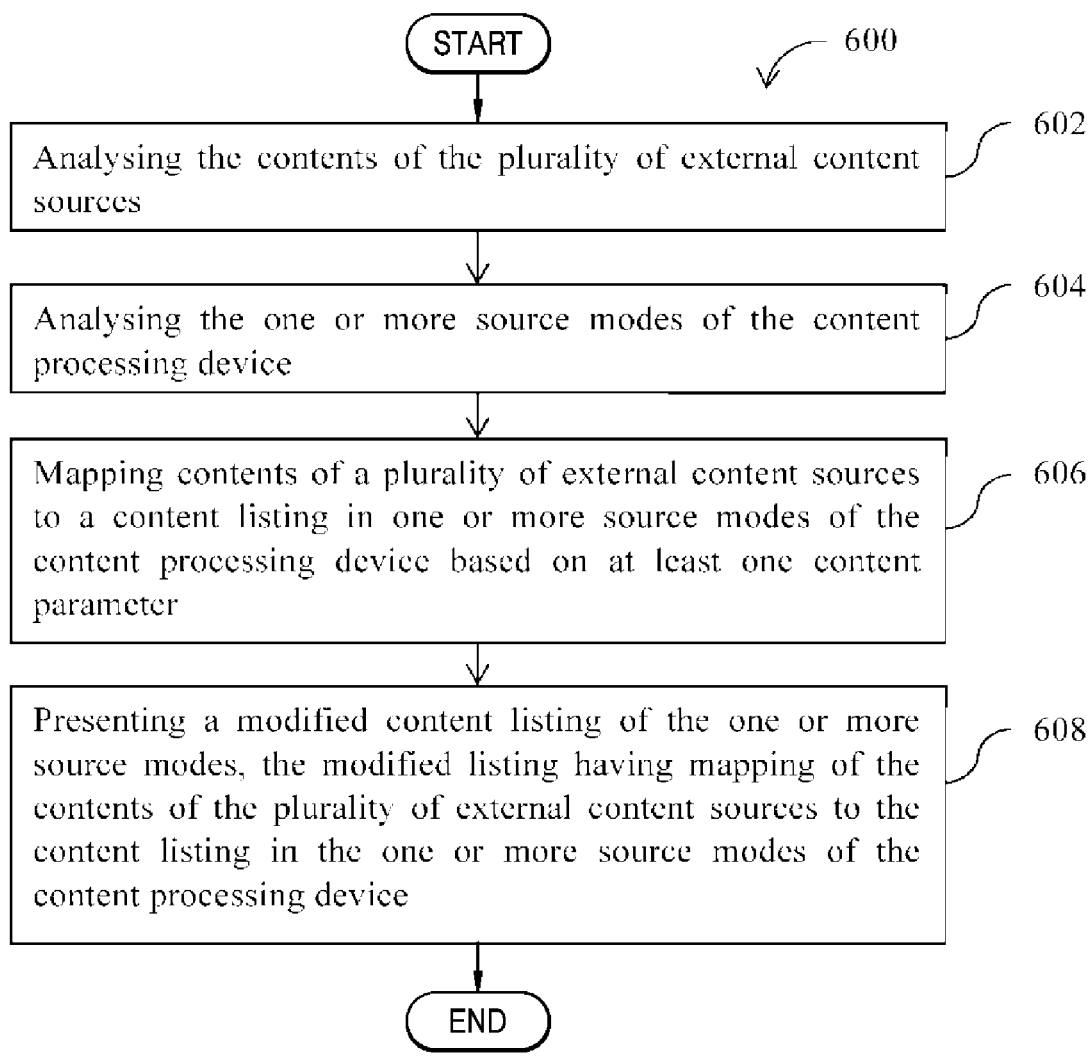
FIG. 6 illustrates a flowchart of a method of mapping external content, according to an exemplary embodiment of the present disclosure.

FIG. 6 illustrates a flowchart of a method 600 for mapping external contents, according to an exemplary embodiment of the present disclosure. The method 600 may be performed by using the content processing device 400.

In operation 602, the contents of the plurality of external content sources 514 are analysed. Here, the plurality of external content sources 514 comprises two or more of a USB device, a HDMI device, a mobile device, a tablet device, a PC, a laptop, storage device, a wirelessly connected device, a set top box, a broadcasting system, etc.

In operation 604, the one or more source modes of the content processing device 400 are analysed. Here, the one or more source modes comprise one or more of a broadcasting mode, an application mode, a multi-screen mode, and a PIP mode, wherein the mapping comprises mapping one external source to one of a channel in the broadcasting mode, an application in the application mode, a screen in the multi-screen mode, a PIP window in the PIP mode. When the content processing device 400 is in a broadcasting mode, unused or least viewed channels are identified and the contents of the plurality of external content sources 514 are mapped to the unused or least viewed channels within the content listing based on the at least one content parameter. When the content processing device 400 is in the application mode, multimedia applications or widgets are identified, and the contents of the plurality of external content sources 514 are mapped to the identified multimedia applications or widgets within the content listing based on the at least one content parameter. When the content processing device 400 is in the multi-screen mode, at least one screen is identified and the contents of the plurality of external content sources 514 are mapped to the at least one screen in the multi-screen mode based on the at least one content parameter. When the content processing device 400 is in the PIP mode, at least one PIP window is identified and the contents of the plurality of external content sources 514 are mapped to the at least one PIP window in the PIP mode based on the at least one content parameter.

In operation 606, contents of a plurality of external content sources 514 are mapped to a content listing in one or more source modes of the content processing device 400, based on at least one content parameter. Here, the at least one content parameter comprises at least one of a genre, metadata, information derived from metadata, size, category, type, etc. of the contents, while the content listing comprises at least one of an EPG, an IPG, a TV guide, a browsing menu, a TV menu, etc.

In operation 608, a modified content listing of the one or more source modes is presented. The modified listing comprises mapping of the contents of the plurality of external content sources 514 to the content listing in the one or more source modes of the content processing device 400. The modified content listing is generated by performing at least one of adding of new content in the content listing, replacing of least viewed content from the content listing with new content, appending new content in the content listing, replacing of unavailable content from the content listing with new content, etc. The modified content listing is presented in a smart view, which lists all the contents of the plurality of external content sources 514 in a single view such that content can be selected from an external content source without explicitly switching to the external content source.

Figure 7:
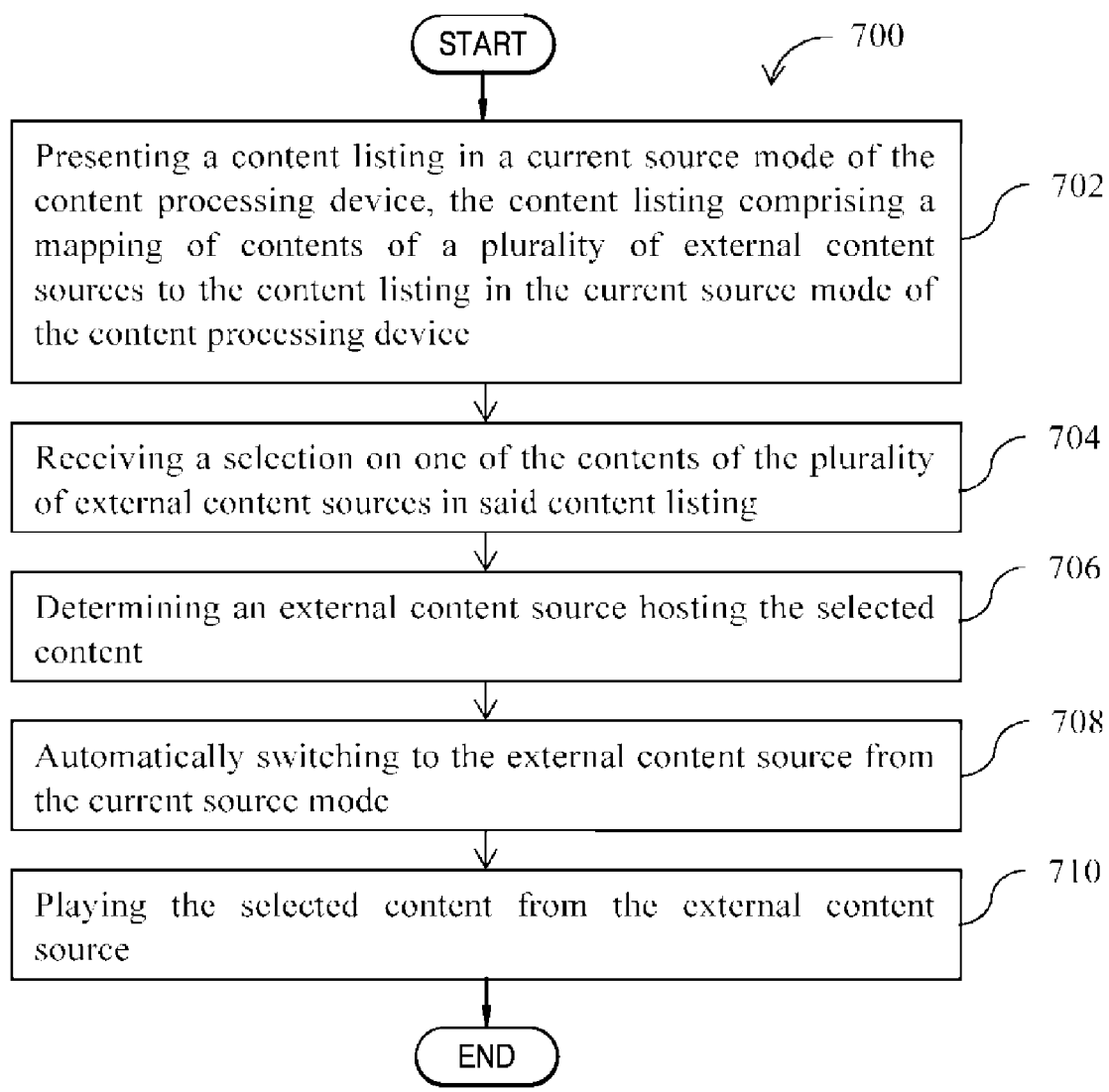
FIG. 7 illustrates a flowchart of a method of playing mapped external content, according to an exemplary embodiment of the present disclosure.

FIG. 7 illustrates a flowchart of a method 700 for playing mapped external content, according to an exemplary embodiment of the present disclosure. The method 700 may be implemented by the content processing device 400. In operation 702, a content listing is presented in a current source mode of the content processing device 400, the content listing comprising a mapping of contents of a plurality of external content sources 514 to the content listing in the current source mode of the content processing device 400.

In operation 704, a selection is received of one of the contents of the plurality of external content sources 514 in the content listing. In operation 706, an external content source hosting the selected content is determined.

In operation 708, the current source mode is automatically switched to the external content source.

In operation 710, the selected content is played from the external content source. In one implementation, the selected content may be streamed from the external content source in the current source mode of the content processing device 400.

Figure 8:
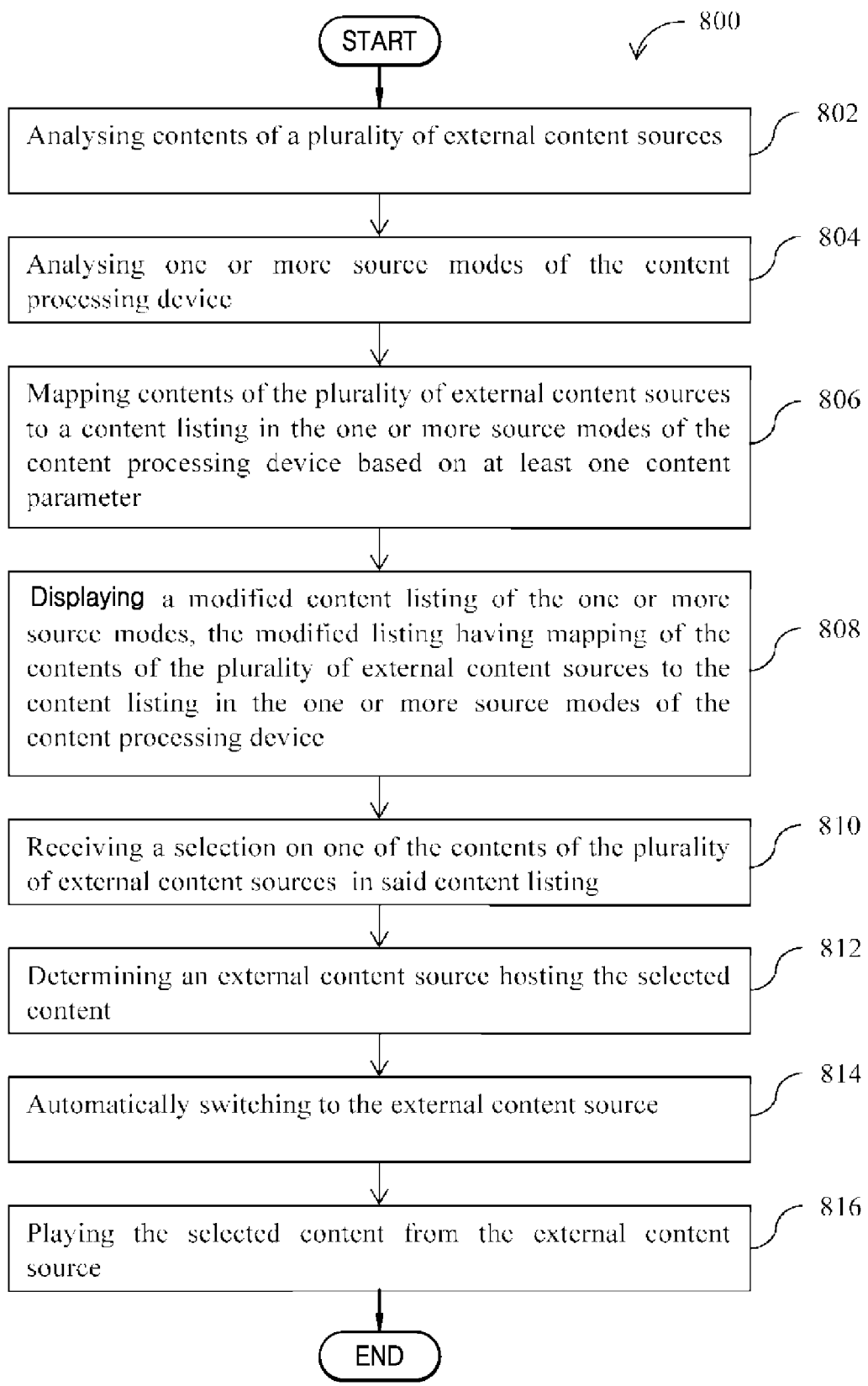
FIG. 8 illustrates a flowchart of an overall method of mapping external content and playing the mapped external content, according to an exemplary embodiment of the present disclosure.

FIG. 8 illustrates a flowchart of an overall method 800 for mapping external content and subsequently playing the mapped external content, according to an exemplary embodiment of the present disclosure. The method 800 may be performed by using the content processing device 400.

In operation 802, contents of a plurality of external content sources 514 are analysed.

In operation 804, one or more source modes of the content processing device 400 are analysed.

In operation 806, contents of the plurality of external content sources 514 are mapped to a content listing in the one or more source modes of the content processing device 400, based on at least one content parameter.

In operation 808, a modified content listing of the one or more source modes is presented. The modified listing comprises mappings of the contents of the plurality of external content sources 514 to the content listing in the one or more source modes of the content processing device 400. In operation 810, a selection is received of one of the contents of the plurality of external content sources 514 in the content listing. In operation 812, the external content source 514 hosting the selected content is determined.

In operation 814, automatic switching to the external content source 514 is performed.

In operation 816, the selected content is played from the external content source 514.

The present disclosure provides a seamless viewing experience, with respect to content present on multiple sources, to users so that users can access all the content present on multiple sources in a smart view mode without having to switch between different sources. Generally, a TV has at least the following source modes by default for playing content: broadcasting mode, application mode, and PIP or multi-screen Mode. According to the present disclosure, genre based mapping of external content to the above mentioned source modes can be provided. Whenever any external device, such as a mobile device, USB device, PC, etc., is connected to the TV, based upon the genre of external content, a list of content is displayed in the corresponding genre of default modes of the TV. In this way, users can select and play external content directly from the default modes of the TV.

Figure 9:
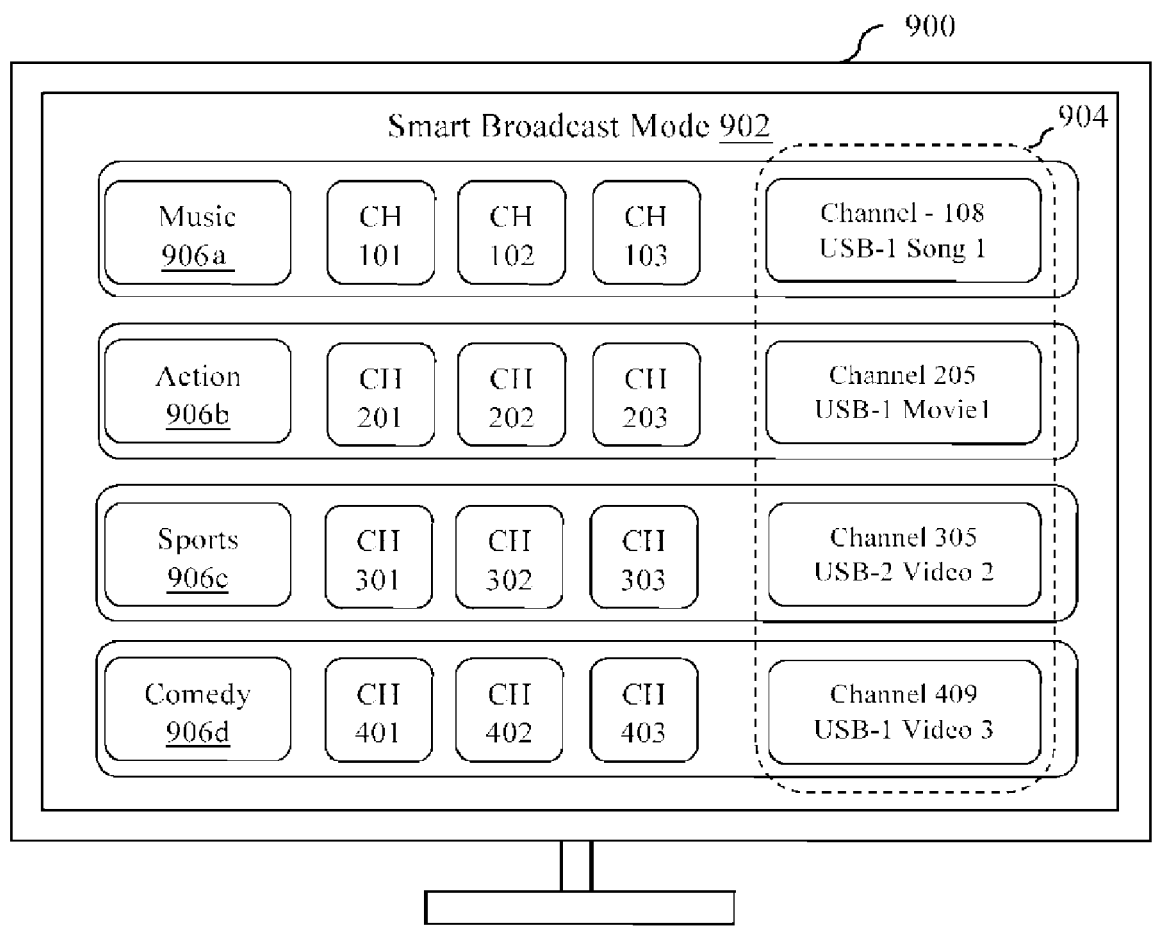
FIG. 9 illustrates a television (TV) having a smart broadcasting mode, according to an exemplary embodiment of the present disclosure.

To this end, FIG. 9 illustrates a TV 900 having a smart broadcasting mode 902, according to an exemplary embodiment of the present disclosure. When two USB devices, USB-1 and USB-2, are connected to the TV 900, contents 904 of the USB devices USB-1 and USB-2 are mapped to least viewed channels based on matching of the genre of the contents 904 with the genres 906*a*-906*d* of the smart broadcasting mode 902. In the example shown in FIG. 9, song 1 from USB-1 is mapped to channel 108 in the music 906*a* genre already having channels 101 to 103; Movie 1 from USB-1 is mapped to channel 205 in the action 906*b* genre already having channels 201 to 203; Video 2 from USB-2 is mapped to channel 305 in the sports 906*c* genre already having channels 301 to 303; and Video 3 from USB-1 is mapped to channel 409 in the comedy 906*d* genre already having channels 401 to 403. On selection of any external content, users can be provided with options, such as 'switch to source' and 'start playback of content'.

Figure 10:
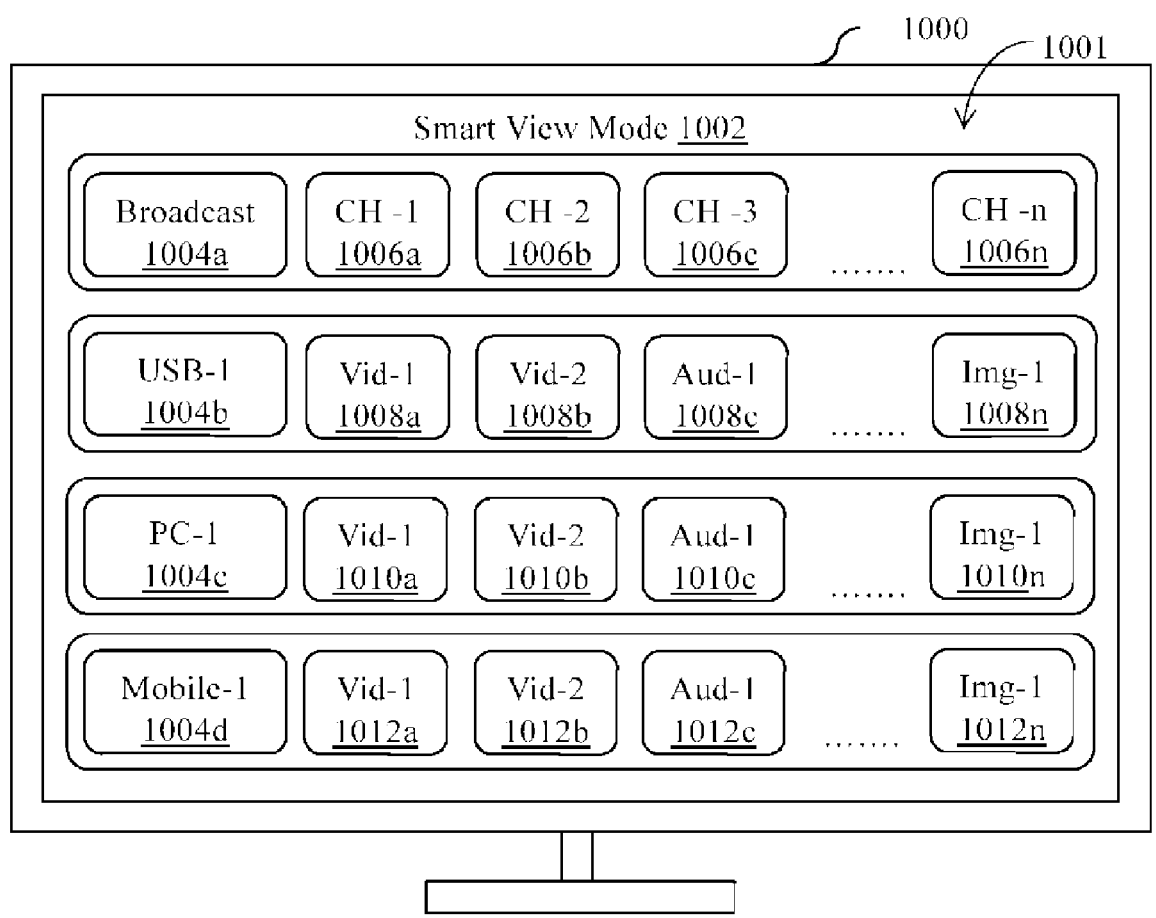
FIG. 10 illustrates a TV having a smart view mode, according to an exemplary embodiment of the present disclosure.

FIG. 10 illustrates a TV 1000 having a smart view mode 1002 according to an exemplary embodiment of the present disclosure. The TV 1000 comprises a content mapping engine configured to map contents of a plurality of external content sources 1004*a*-1004*d* to a content listing in one or more source modes of the content processing device 400 based on at least one content parameter. The TV further comprises a user interface 1001 configured to present a modified content listing of the one or more source modes, the modified listing having mappings of the contents of the plurality of external content sources 1004*a*-1004*d* to the content listing in the one or more source modes of the content processing device 400. The modified content listing is generated by performing at least one of adding of new content in the content listing, replacing of least viewed content from the content listing with new content, appending of new content in the content listing, and replacing of unavailable content from the content listing with new content.

The user interface 1001 presents the modified content listing in a smart view mode 1002 listing all the contents of the plurality of external content sources 1004*a*-1004*d* in a single view such that content can be selected from an external content source without explicitly switching to the external content source. In the smart view mode 1002, users can access all the content present on connected or paired devices with the TV 1000 in a single view so that users can play any content from any source without having to switch to that source. The smart view mode 1002 presents the contents 1006*a*-1006*n* of broadcast mode 1004*a*, contents 1008*a*-1008*n* of USB-1 1004*b*, contents 1010*a*-1010*n* of PC-1 1004*c*, and contents 1012*a*-1012*n* of mobile-1 1004*d* in a single view to users. In the example shown in FIG. 10, the contents are grouped by source and within each group can be arranged according to filetype, filename, or by any other relevant content parameter.

Figure 11:
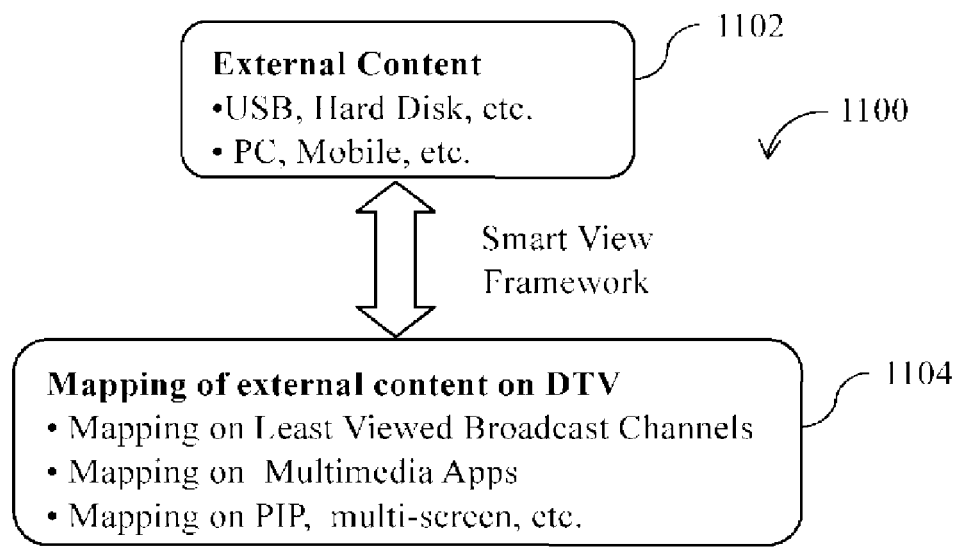
FIG. 11 illustrates a smart view framework according to an exemplary embodiment of the present disclosure.

FIG. 11 illustrates a smart view framework 1100 according to an exemplary embodiment of the present disclosure. The smart view framework 1100 enables mapping of externally stored multimedia content shown in block 1102 with least viewed broadcast channels or video on demand applications/widgets or PIPs/multi-screen as shown in block 1104. In this way, users can access external content in parallel to a current content mode rather than repeatedly switching between multiple sources. In other words, users have an option for a "single source play all content" mechanism on their TV to access content from different sources in a single source mode. In relation to the present disclosure, the TV may provide a smart view mode, mapping of external content in a broadcasting mode, mapping of external content in an application mode, and mapping of external content in a PIP/multi-screen mode. Using these features, viewers can access content from different sources in a single source and do not need to keep on repeatedly switching between sources. Moreover, these features provide a convenient viewing experience to viewers who like to play movies, songs, etc., from the external sources.

This smart view framework 1100 enables automated mapping by taking intelligence based decisions. One aspect of this framework is to stream external content from connected devices, such as a USB device or external hard disk, to a current mode of the TV. Another aspect of this framework 1100 is to map and stream the external content to least viewed broadcast channels so that users can access external content directly without the need of switching the source mode to USB. Another aspect of this framework 1100 is to perform genre based mapping and streaming of external content to broadcast channels, apps, and PIP/multi-screen based upon the current genre of content being viewed. Another aspect of this framework 1100 is to map and stream the external content to multimedia applications provided in the TV so that streamed content can be accessed through these apps directly. Another aspect of this framework 1100 is to map and stream the external content to PIP/multi-screen so that whenever PIP/multi-screen is turned on, the user can directly access the locally stored content without the need to switch to the external source.

Figure 12:
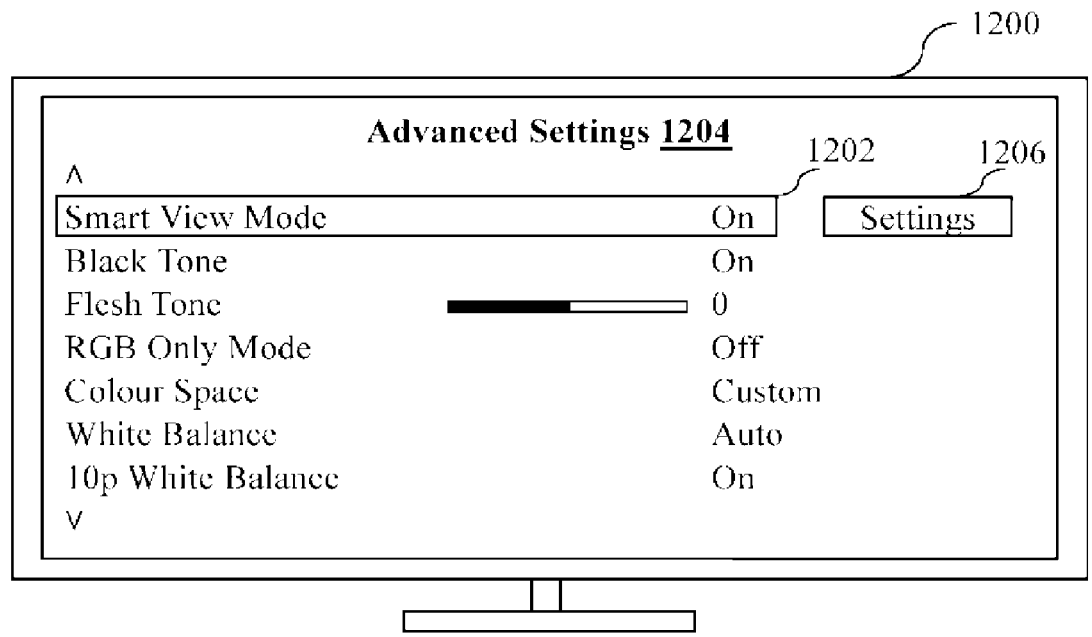
FIG. 12 illustrates an option in TV settings to turn on smart view mode, according to an exemplary embodiment of the present disclosure.

FIG. 12 illustrates a TV 1200, wherein an option 1202 to turn on smart view mode according to an exemplary embodiment of the present disclosure is provided in the advance settings 1204 in a TV menu along with other routine options. Further settings 1206 of the smart view mode can be controlled automatically or manually by a user.

Figure 13:
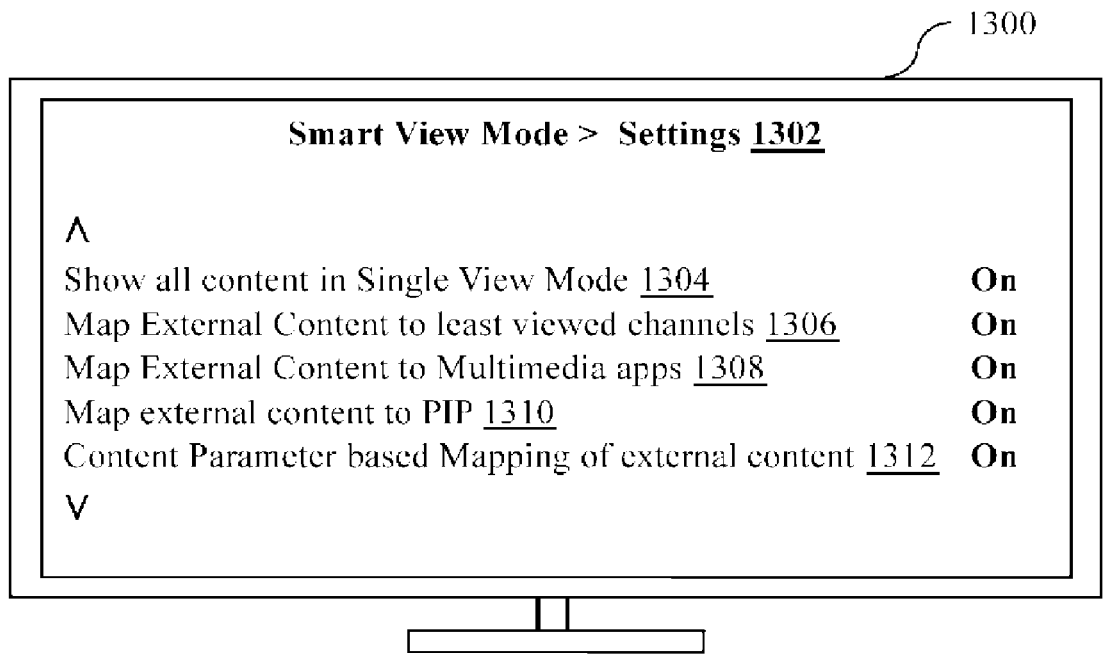
FIG. 13 illustrates further setting options in smart view mode, according to an exemplary embodiment of the present disclosure.

FIG. 13 illustrates a TV 1300, wherein user defined settings 1302 of a smart view mode according to an exemplary embodiment of the present disclosure are depicted. The user defined settings comprise settings such as 'show all content in Single View Mode' 1304, 'Map External Content to least viewed channels' 1306, 'Map External Content to Multimedia apps' 1308, 'Map external content to PIP' 1310, 'Content Parameter based Mapping of external content' 1312, etc.

Figure 14:
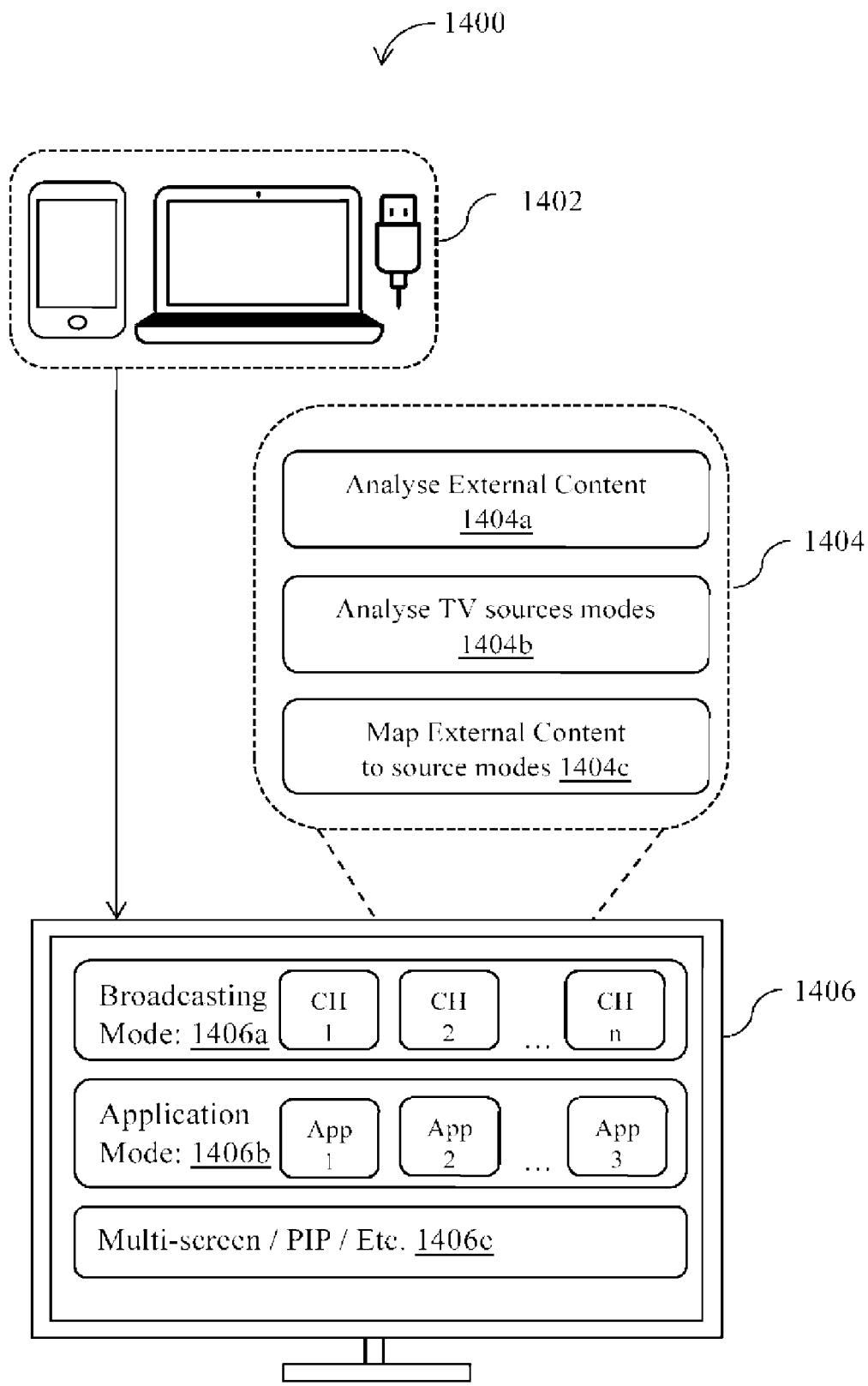
FIG. 14 illustrates an overall framework according to an exemplary embodiment of the present disclosure.

FIG. 14 illustrates an overall framework 1400 according to an exemplary embodiment of the present disclosure. The framework 1400 provides an intelligent mapping of externally stored content to broadcast channels, apps, or PIPs/multi-screen based upon content parameters, such as genre, identification, and other aspects related to the user's viewing habits. Referring to FIG. 14, multiple external content sources 1402 may be connected to a TV 1406 having an external content processor 1404, such as the external content processor 428, according to an embodiment of the present disclosure.

In operation 1404a, the external content processor 1404 analyses external content from multiple external sources. The analysis involves determining at least one relevant content parameter. For example, Table 1 shown below indicates such a sample analysis, where the type of content along with genre information is determined as content parameters.

TABLE 1

| External Source | External Content | Content Parameter | |
|---|---|---|---|
| | | Type | Genre |
| USB | Titanic.mp4 | Movie | Romantic |
| USB | Jurassic.avi | Movie | Action |
| USB | Video1.mp4 | Video | Entertainment |
| PC | RockSong.mp3 | Sono | Music |
| PC | Song2.mp3 | Song | Music |
| Mobile | Video1.avi | Video | Sports |
| Mobile | Video2.avi | Video | Kids |

In operation 1404b, the external content processor 1404 analyses items of various source modes for example, as listed in Table 2 below

TABLE 2

| Source Modes | Items | Content Parameter (Frequency, Type, etc.) |
|---|---|---|
| Broadcast Mode | Channel-1 | Least Viewed |
| Broadcast Mode | Channel-2 | Least Viewed |
| Broadcast Mode | Channel-N | Empty |
| Application mode | App-1 | Video |
| Application mode | App-2 | Video, Flash |
| Application mode | App-N | Video, Audio |
| PIP Mode | PIP | Video |

In operation 1404c, the external content processor 1404 maps the external content to items of the source modes based on the content parameter identification shown in Tables 1 and 2. Table 3 shown below depicts the mapping of external content with the items of source modes.

TABLE 3

| Source Modes | Items | External Content | External Source |
|---|---|---|---|
| Broadcast Mode | Channel-1 | Titanic.mp4 | USB |
| Broadcast Mode | Channel-2 | Jurassic.avi | USB |
| Broadcast Mode | Channel-N | RockSong.mp3 | PC |
| Application mode | App-1 | Video1.avi | Mobile |
| Application mode | App-2 | Video2.avi | Mobile |
| Application mode | App-N | Song2.mp3 | PC |
| PIP Mode | PIP | Video1.mp4 | USB |

In this way, the external content can be streamed directly in a current source mode based on the above indicated mapping table. More specifically, the present disclosure provides automated streaming of the external content in a broadcasting mode 1406a, including automated streaming of the external content to least viewed channels, appending the external content to empty channels present in mapped genre, and mapped streaming of external content according to genre, such as sports, movies, entertainment, news, etc. The present disclosure also provides automated streaming of the external content in an application mode 1406b, including automated mapping of the external content to multimedia apps, automated mapping of the external content to genre based apps, and automated mapping to multimedia widgets to play the external content. The present disclosure also provides automated streaming of the external content in multi-screen or a PIP mode 1406c, including automated streaming of the external content to the multi-screen or PIP.

FIG. 15 illustrates a high level flowchart 1500 in terms of key aspects according to an exemplary embodiment of the present disclosure.

In operation 1502, external content is analysed by an external content analyser to determine a content parameter, such as the genre of contents. For this, a list of the external content stored in connected devices, such as a USB device, PC, mobile device, tablet, etc. is prepared. Then, the external content is categorized according to genre, such as entertainment, horror, romantic, action, sports, etc., on the basis of metadata, internet assistance, filenames, user history, etc., of the external content. The external content analyser is basically responsible for analysing content present on the paired/connected devices which can be played on a TV. The external content analyser will first identify the list of devices connected to the TV and will prepare a database of content present on each device as shown below in Table 4.

TABLE 4

| Device | Connectivity | Content Name | Type | Genre | Category |
| --- | --- | --- | --- | --- | --- |
| USB-1 | Direct | Titanic.mp4 | Video | Romance, Drama | Movies |
| USB-1 | Direct | JurassicPark.mp4 | Video | Action, Horror | Movies |
| USB-2 | Direct | IGT_EP1_S3.mp4 | Video | Drama | Programs |
| USB-2 | Direct | IGT_EP2_S3.mp4 | Video | Drama | Programs |
| USB-2 | Direct | IGT_EP3_S3.mp4 | Video | Drama | Programs |
| USB-2 | Direct | Song1.mp3 | Audio | Soft | Music |
| PC-1 | DLNA | Song2.mp3 | Audio | Rock | Music |
| PC-1 | DLNA | Song3.mp3 | Audio | Rock | Music |
| Mobile-1 | Screen Mirroring | Video1.mp4 | Video | Fun, Entertainment | Programs |
| Mobile-1 | Screen Mirroring | Song4.mp3 | Audio | Soft | Music |
| Mobile-2 | Streaming | Song5.mp3 | Audio | Rock | Music |

As shown in Table 4 above, the database, which provides information about the content present on the paired devices, is prepared. The important information present in this database is the genre and the category of the external content stored on the connected devices. This information is used further to provide proper mapping of the external content to broadcast channels or multimedia apps based upon their genre. The genre and category based information can be extracted in different ways, such as by parsing the metadata information present in files.

In operation 1504, source modes are analysed to determine relevant content parameters. More specifically, various source modes, such as broadcasting mode, app mode, multi-screen mode, PIP mode, etc., are analysed to identify least viewed channels, a genre of a current mode, genres of apps, PIP, etc.

In operation 1506, the external content is mapped to the source modes on the basis of determined content parameters. For example, an external content genre is mapped to a current mode genre, the external content is mapped to the least viewed channels, the external content is mapped to the multimedia apps, and the external content is mapped to the PIP.

Figure 16A:
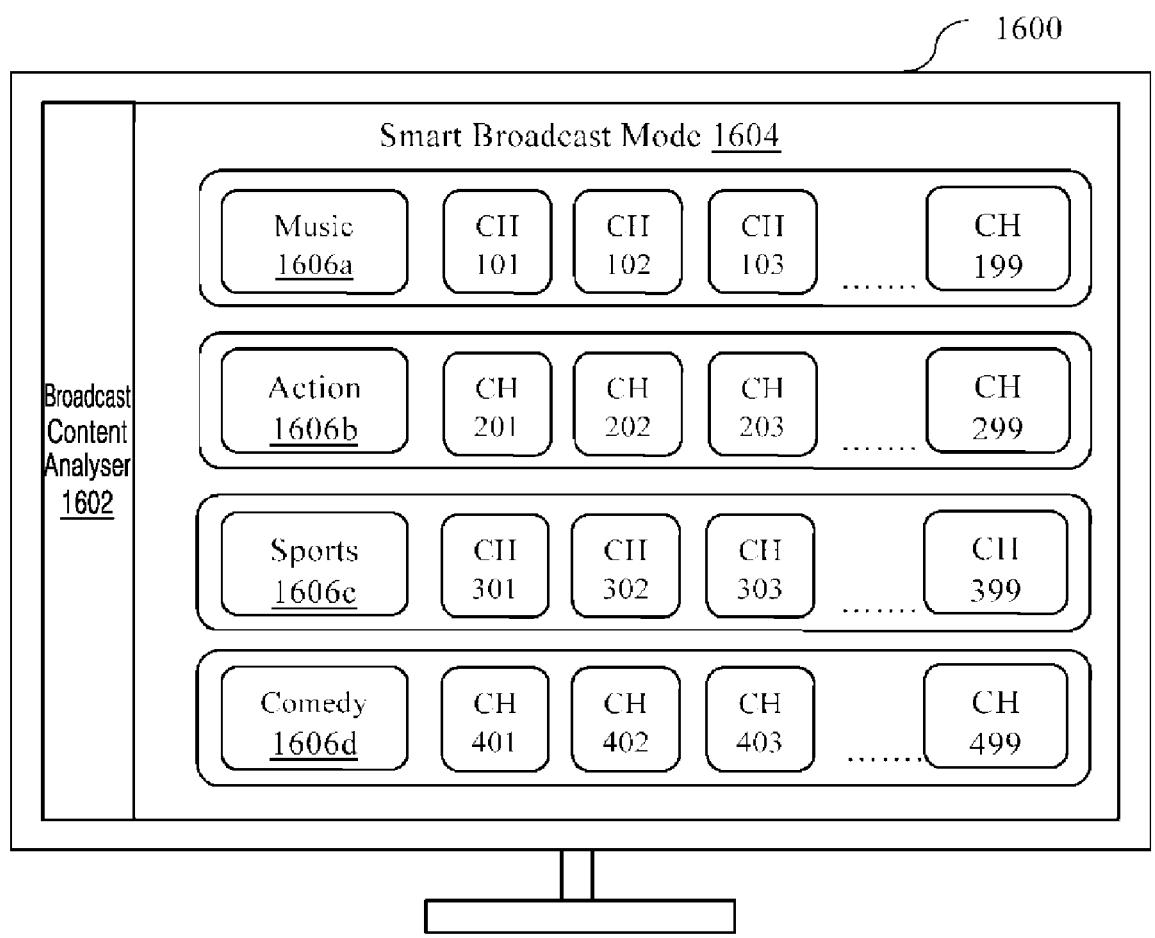
FIGS. 16A-16D illustrate a television (TV) having a broadcast content analyser configured to implement a smart broadcast mode according to an exemplary embodiment of the present disclosure.

FIGS. 16A-16D illustrate a TV 1600 having a broadcast content analyser 1602 configured to implement a smart broadcast mode, according to an exemplary embodiment of the present disclosure. In one implementation, the broadcast content analyser 1602 can be a part of the source mode analyser 504 described previously. Referring to FIG. 16A, the broadcast content analyser 1602 is responsible for identification of user interest in broadcast channels shown in a smart broadcast mode 1604 and to analyse which are the most viewed channels and which are the least viewed channels at any given span of time.

Nowadays, genre 1606a-1606d of the broadcast channels 101-499 are already available to the broadcast providers. So the TV 1600 already has the information about each channel's genre. Already each channel number is categorized by the broadcast service provider according to the genre. Further, the broadcast content analyser 1602 further identifies the viewer's preference by identifying most viewed channels and/or the least viewed channels. Based upon the duration of viewing time of any particular channel or program, the broadcast content analyser analyses what kind of content or channels are preferred by the users and what are the least viewed channels. When the least viewed channels are identified, the external content can be streamed on those least viewed channels.

The broadcast content analyser 1602 analyses the viewing habits of the user and based upon this analysis, prepares a list of channels which are most viewed by the user as well as a list of channels which are least viewed by the user. Table 5 below shows a sample database of channels prepared by the broadcast content analyser 1602, which includes information related to the programs as well as the channels.

TABLE 5

| Channel | Category | Genre | Viewing Frequency |
| --- | --- | --- | --- |
| CH 101 | Music | Rock | Most Viewed |
| CH 102 | Music | Bollywood | Most Viewed |
| CH 103 | Music | Pop | Most Viewed |
| CH 104 | Music | Jazz | Least Viewed |
| CH 199 | Music | Instrumental | Least Viewed |
| CH 201 | Action | Classic | Most Viewed |
| CH 202 | Action | Si-Fi | Most Viewed |
| CH 203 | Action | Adventure | Most Viewed |
| CH 204 | Action | Crime | Least Viewed |
| CH 299 | Action | Fantasy | Least Viewed |
| CH 301 | Sports | Cricket | Most Viewed |
| CH 302 | Sports | Football | Most Viewed |
| CH 303 | Sports | Tennis | Most Viewed |
| CH 304 | Sports | Racing | Least Viewed |
| CH 399 | Sports | Others | Least Viewed |
| CH 401 | Comedy | Dark | Most Viewed |
| CH 402 | Comedy | Light | Most Viewed |
| CH 403 | Comedy | Rom-Com | Most Viewed |
| CH 404 | Comedy | Animation | Least Viewed |
| CH 499 | Comedy | Popular | Least Viewed |

Figure 16B:
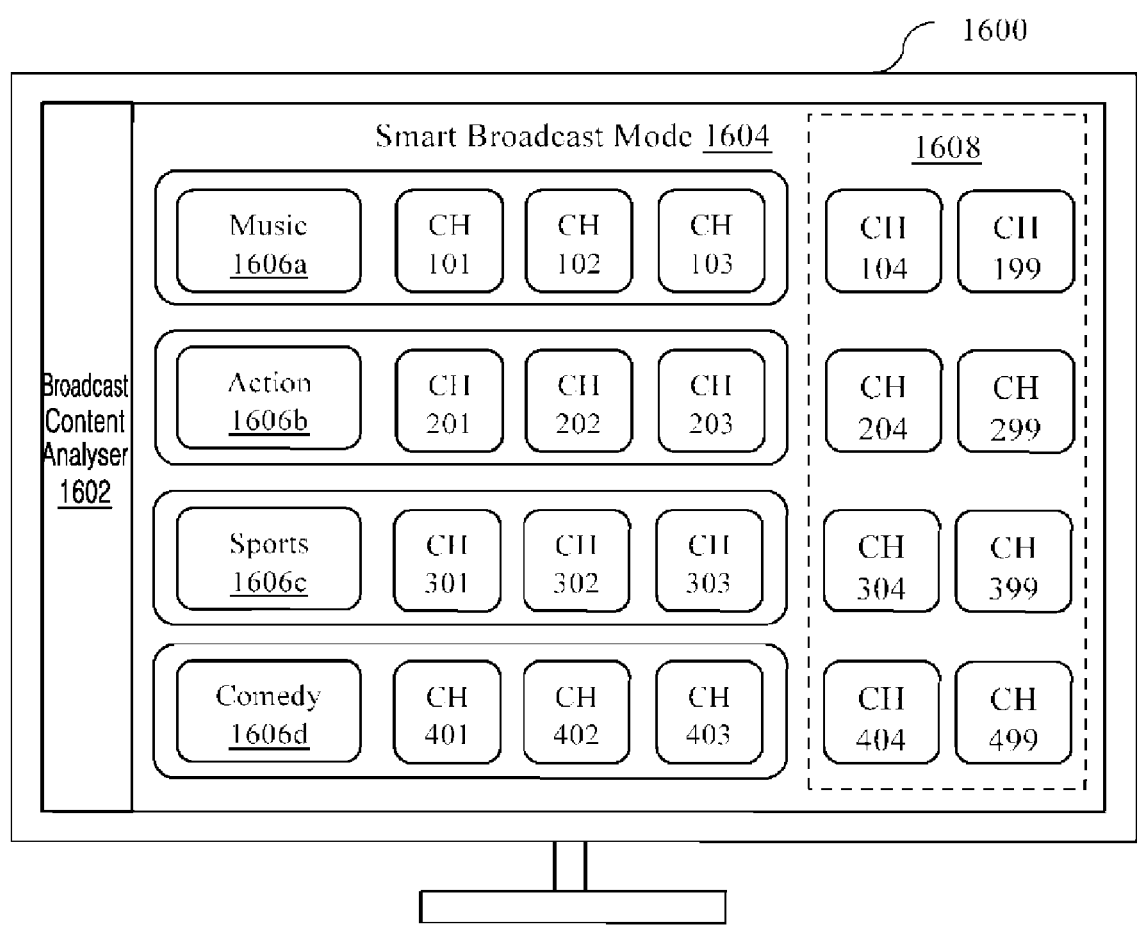

Based upon this analysis, it can be seen that there are lot of channels which are not frequently viewed by the user. Reasons may vary from user to user for not viewing a channel for a long time. On this note, the graphical representation of the broadcast channels can be further divided based on viewing frequency analysis. Referring to FIG. 16B, the broadcast content analyser 1602 identifies empty channels as well as the least viewed channels 1608 in each genre. Since these channels are either empty or least viewed by the user, these channels can be used to map and show the external content, which may be of more interest to the user. A sample mapping is shown in Table 6 below.

TABLE 6

| Channel | Frequency | Content Name | Source |
|---|---|---|---|
| CH 104 | Least Viewed | Song1.mp3 | USB-1 |
| CH 199 | Least Viewed | Song2.mp3 | USB-1 |
| CH 204 | Least Viewed | Movie1.mp4 | USB-2 |
| CH 299 | Least Viewed | Movie2.mp4 | USB-2 |
| CH 304 | Least Viewed | Video1.mp4 | USB-2 |
| CH 399 | Least Viewed | video2.mp4 | USB-1 |
| CH 404 | Least Viewed | Movie3.mp4 | USB-2 |
| CH 499 | Least Viewed | Video3.mp4 | USB-1 |

Figure 16C:
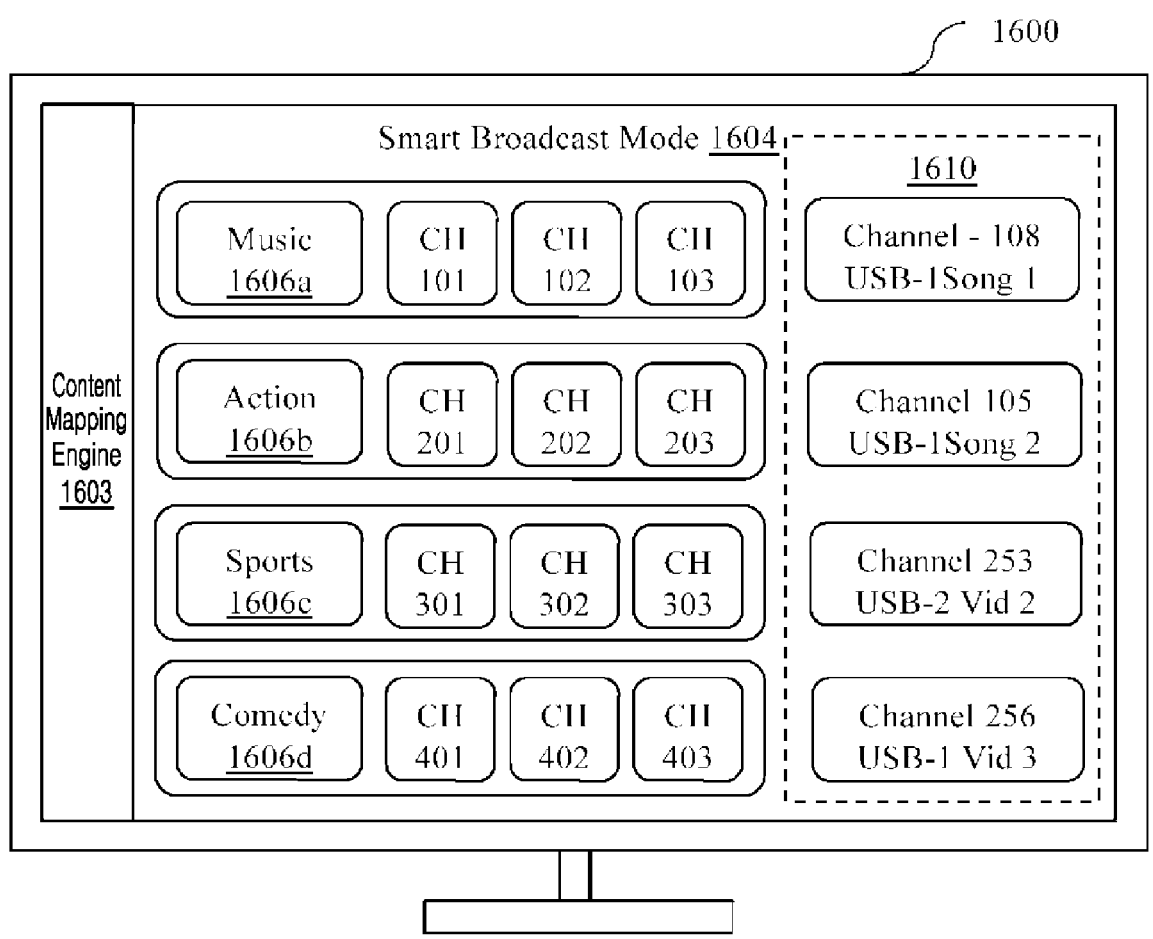

FIG. 16C illustrates the sample mapping 1610 of the external content to the least viewed channels done by a content mapping engine 1603. As shown, Song 1 from USB 1 is mapped to Channel 108, Song 2 from USB 1 is mapped to channel 105, video 2 from USB 2 is mapped to channel 253, and video 3 from USB 1 is mapped to channel 256.

Figure 16D:
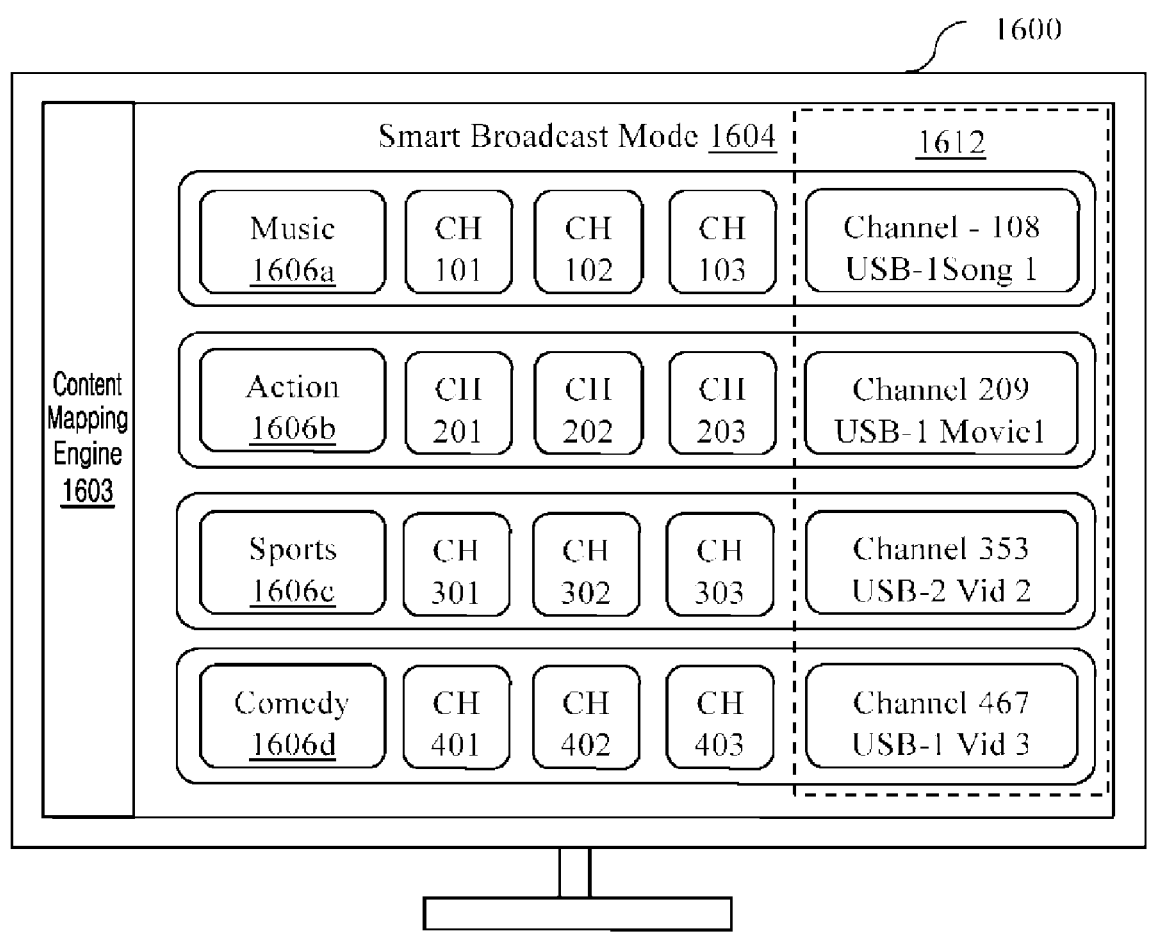

To have external content presentation more systematic and managed, FIG. 16D illustrates a genre based mapping 1612 of the external content to the broadcast channels done by the content mapping engine 1603. As shown, Song 1 from USB 1 is mapped to the Channel 108 in Music>Rock genre 1606a, Movie 1 from USB 1 is mapped to the channel 209 in Action>Adventure genre 1606b, video 2 from USB 2 is mapped to the channel 353 in Sports>Cricket genre 1606c, and video 3 from USB 1 is mapped to the channel 467 in Comedy>Anaimation genre 1606d. This genre based mapping 1612 provides a more enhanced viewing experience to viewers. For example, if a viewer is currently viewing content in a Movies category, content which has a category matching the genre in the Movies category will be mapped to the empty or least viewed channels of the Movies Category as shown in Table 7 below.

TABLE 7

| Channel | Frequency | Content Name | Source | Category | Genre |
|---|---|---|---|---|---|
| CH_108 | Least Viewed | Song1.mp3 | USB-1 | Music | Rock |
| CH_209 | Empty | Movie1.mp4 | USB-1 | Action | Adventure |
| CH_353 | Empty | Video2.mp4 | USB-2 | Sports | Cricket |
| CH_467 | Least Viewed | Video3.mp4 | USB-1 | Comedy | Animation |

Figure 17A:
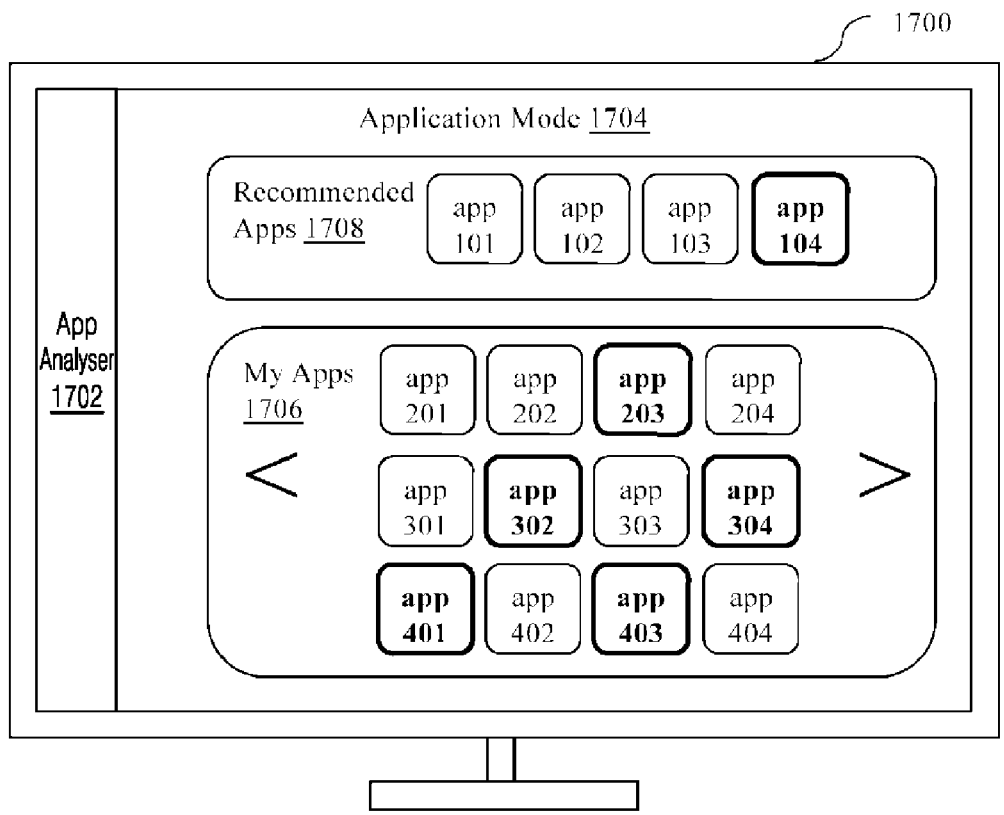
FIGS. 17A and 17B illustrate a TV having an app analyser configured to implement an application mode according to an exemplary embodiment of the present disclosure.
Figure 17B:
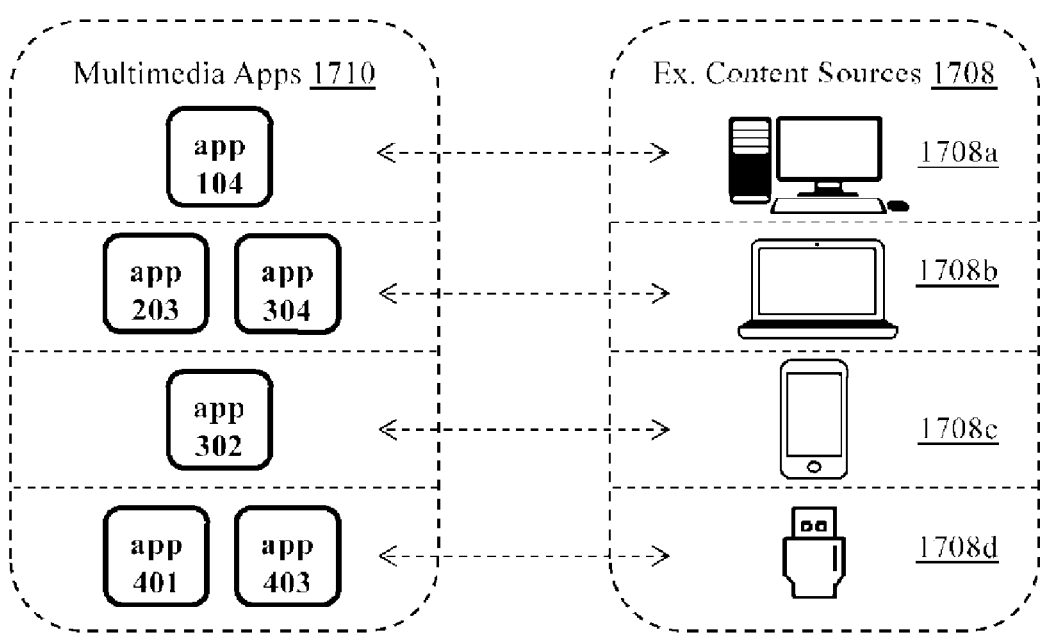

FIGS. 17A-17B illustrate a TV 1700 having an app analyser 1702 configured to implement an application mode 1704, according to an exemplary embodiment of the present disclosure. In one implementation, the app analyser 1702 can be a part of the source mode analyser 504 described above. There are many multimedia apps preinstalled on a DTV, which provide playback functionality. Such apps can be used to play content stored on external devices so those users do not need to repeatedly switch between the sources.

Referring to FIG. 17A, the app analyser 1702 analyses installed apps 1706 and/or recommended apps 1708 on the TV 1700. Generally, there is a list of applications which the user can install on the TV 1700. Many of these applications are multimedia based applications capable of playing multimedia content. The app analyser 1702 maps the external content to the multimedia apps based on its category and genre. In other words, each app installed or recommended on the TV 1700, which can play the multimedia content is listed along with category and genre of content played in the particular app, as shown in Table 8 below.

TABLE 8

| Application | Category | Genre |
|---|---|---|
| APP_104 | Video | Movies |
| APP_203 | Video | Programs |
| APP_302 | Video | Sports |
| APP_304 | Video | Movies |
| APP_401 | Audio | Soft |
| APP_403 | Audio | Rock |

Referring to FIG. 17B, each external content source 1712 is mapped to one or more multimedia apps 1710, according to an embodiment of the present disclosure. For example, PC 1712a is mapped to app_104, laptop 1712b is mapped to app 203 and 304, mobile device 1712c is mapped to app 302, and USB device 1712d is mapped to app 401 and app 403. In this way, the content of external content sources 1712 are playable from the mapped multimedia apps 1710.

Figure 18:
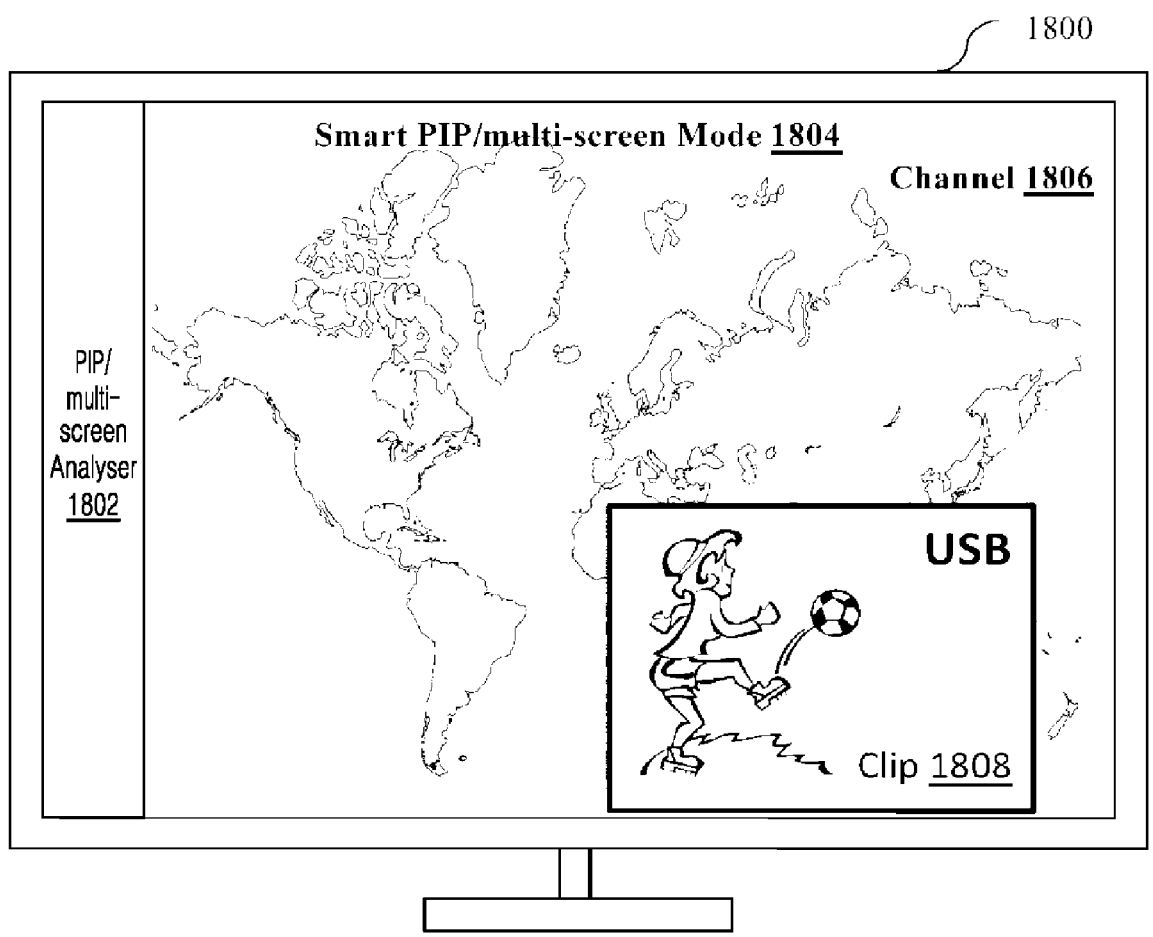
FIG. 18 illustrates a TV having a picture in picture (PIP)/multi-screen analyser configured to implement a smart PIP/multi-screen mode according to an exemplary embodiment of the present disclosure.

FIG. 18 illustrates a TV 1800 having a PIP/multi-screen analyser 1802 configured to implement a smart PIP/multi-screen mode 1804, according to an embodiment of the present disclosure. In one implementation, the PIP/multi-screen analyser 1802 can be a part of the source mode analyser 504 described previously. The PIP/multi-screen analyser 1802 enables streaming of external content to a PIP/multi-screen. Also, based upon the background content, such as channel 1806, being played when the PIP/multi-screen 1808 is turned on, the PIP/multi-screen analyser 1802 can perform genre based mapping. The external content can be mapped to the PIP/multi-screen 1808 so that whenever the user wants to watch the external content in parallel to current content, the user can easily access the external content via the PIP/multi-screen mode 1804. This will provide the user a parallel viewing experience with respect to multiple contents from the multiple sources.

Figure 19:
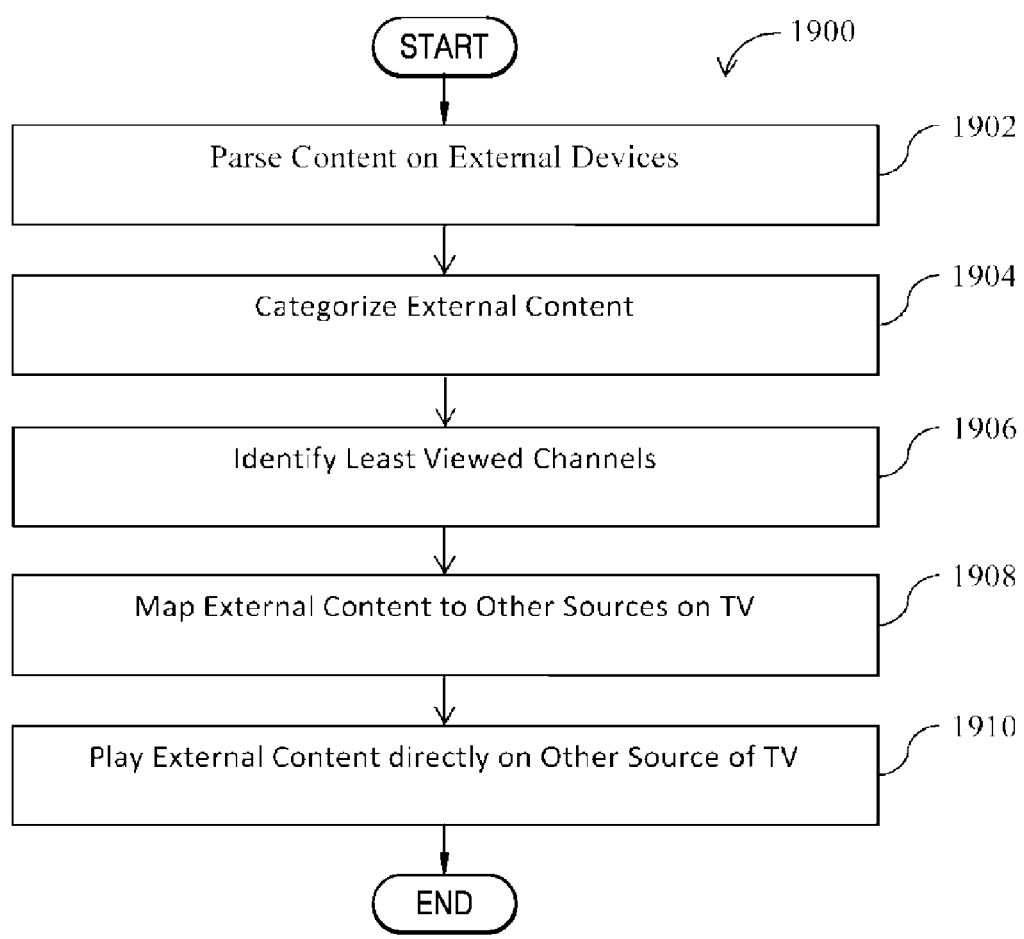
FIG. 19 illustrates a flowchart of the present disclosure according to an exemplary embodiment of the present disclosure.

FIG. 19 illustrates a flowchart 1900 of the present disclosure according to a specific embodiment of the present disclosure. To implement the present disclosure, certain operations can be performed and based upon output of these operations, certain other operations can also be performed. Here only the basic operations are explained, but this present disclosure is not limited to just these operations.

In operation 1902, content present on the external devices is parsed. A framework exists in the many TV, which provides listing and execution of flash based USB widgets in the application mode. The same framework can be used to enlist the multimedia content present in external storages and playback of the multimedia content using inbuilt multimedia players as well as other multimedia content players. How the multimedia content present in the external storage can be listed on a TV is described below.

If any external device is connected or disconnected to the TV, an external device pairing notification is sent to the currently active source. Once any external device is connected to the TV, a content parsing thread can be executed in the background to list the content present on the paired devices. The same method can be used to list the multimedia content present on the external device by parsing the external device in the background. Once the content present in the external devices is parsed and listed, a database (as shown in Table 9 below) of content can be prepared with parameters of the external content such as content type, size, category, etc.

TABLE 9

| Device | Connectivity | Content Name |
|---|---|---|
| USB-1 | Direct | Titanic.mp4 |
| USB-1 | Direct | JurassicPark.mp4 |
| USB-2 | Direct | IGT_EP1_S3.mp4 |
| USB-2 | Direct | IGT_EP2_S3.mp4 |
| USB-2 | Direct | IGT_EP3_S3.mp4 |
| USB-2 | Direct | Song1.mp3 |
| PC-1 | DLNA | Song2.mp3 |
| PC-1 | DLNA | Song3.mp3 |
| Mobile-1 | Screen Mirroring | Video1.mp4 |
| Mobile-1 | Screen Mirroring | Song4.mp3 |
| Mobile-2 | Streaming | Song5.mp3 |

This database provides information about the content present on the paired devices. Other important information present in such databases is the genre and category of the external content stored on the connected devices.

In operation 1904, the external content is categorized. Once the external content is listed, the metadata of each of the content is analysed to identify the content genre and category, as shown in Table 10 below. This can be done by analysing the certain metadata present with content, such as name, file extension, details, etc.

TABLE 10

| Device | Connectivity | Content Name | Type | Genre | Category |
|---|---|---|---|---|---|
| USB-1 | Direct | Titanic.mp4 | Video | Romance, Drama | Movies |
| USB-1 | Direct | JurassicPark.mp4 | Video | Action, Horror | Movies |
| USB-2 | Direct | IGT_EP1_S3.mp4 | Video | Drama | Programs |
| USB-2 | Direct | IGT_EP2_S3.mp4 | Video | Drama | Programs |
| PC-1 | DLNA | Song2.mp3 | Audio | Rock | Music |
| PC-1 | DLNA | Song3.mp3 | Audio | Rock | Music |
| Mobile-1 | Screen Mirroring | Video1.mp4 | Video | Fun, Entertainment | Programs |
| Mobile-2 | Streaming | Song5.mp3 | Audio | Rock | Music |

In operation 1906, the least viewed channels are identified. This can be achieved by analysing viewing habits of the user. User profiling can also be considered in the case of a multi-user environment. Depending upon the average time spent on any channel, the channel can be listed as highly viewed, moderately viewed or least viewed. This can be done by taking out the average of total time spent viewing channels by the user for a particular period span, for example, 1 Month.

Equation 1

$$\text{Total Time} = \text{Time Spent on Channel 1} + \text{Time Spent on Channel 2} + \ldots + \text{Time spent on Channel } N$$

$$\text{Average Time} = \frac{\text{Total Time Spent on Viewed Channels}}{\text{Total Number of Viewed Channels } (N)}$$

The channels which are viewed for much less than the average time can be considered as moderately viewed or the least viewed channels. These channels can be further utilized to display some other content which may be of interest to the user.

In operation 1908, the external content is mapped to other sources on the TV. This can be done in multiple ways. Once the databases of the external content, the least viewed channels and the multimedia apps are ready, a virtual mapping of the external content to any of the aforementioned TV sources is created based upon genre mapping or availability of the TV sources. This can be a manual function performed by the user to select the external content and map to any TV source or can also be an automated process based upon user inputs and preferences.

In operation 1910, the external content is played directly on other sources of the TV. There can be two options for playback of the external content on any TV source. A first option is to select and play the external content on a mapped source selection. This is one method of playing the content from the USB or any external device connected to the TV. The only difference is that the user will have an option to play the content from the different TV source. Whenever the user will select any least viewed channel or Multimedia App or PIP, the user will get the list of available/present external content and can select any of the content and play the content. A second option is to automatically stream the external content on the mapped TV source: This method creates a local content streaming server on the TV itself so that the TV can stream the external content to the mapped TV sources. In the case of streaming of the local content to the mapped TV, when the external device is not capable of streaming the content to the TV, the TV itself will stream the content from the external device, for example, a USB device, hard disk, etc., to the mapped TV sources. The TV will stream the local content to a local IP host so that the apps or least viewed broadcast channels can receive the streamed local content. Once the device is connected to the TV, the content is accessible to the TV. The TV can now stream the local content to any of the least viewed channels or PIP or any multimedia application by applying local host streaming methods.

In continuation to the operation 1908 of FIG. 19, FIGS. 20A-20C illustrate multiple ways of mapping the external content sources 2000 to the TV 2002 sources, according to various exemplary embodiments of the present disclosure.

Figure 20A:
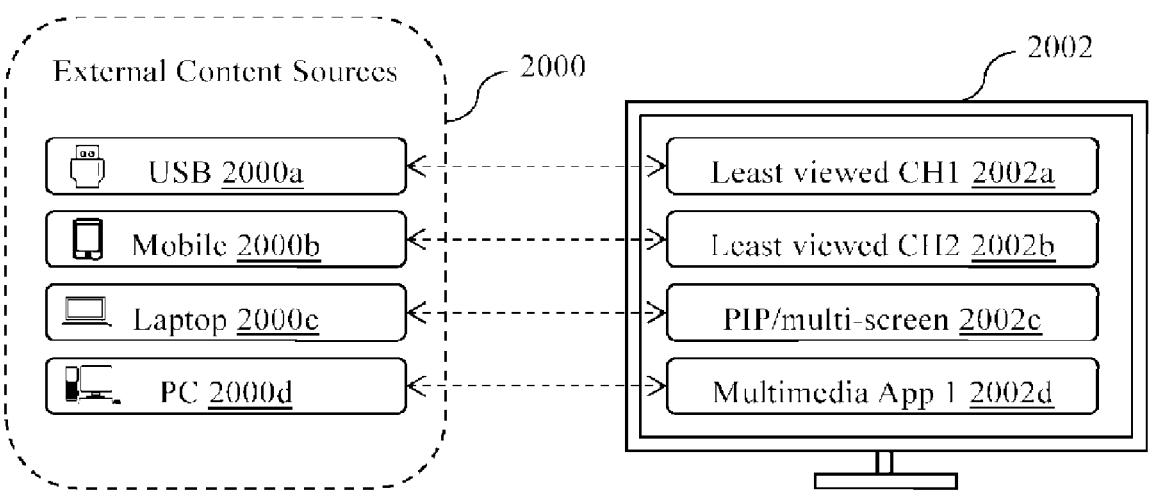
FIGS. 20A-20C illustrate multiple ways of mapping external content to TV sources, according to various exemplary embodiments of the present disclosure.

More specifically, FIG. 20A illustrates a device configured to perform TV source mapping. In this type of mapping, content present on a particular device is mapped to a particular DTV source. For example, content present on a USB device 2000a is mapped to a least viewed channel 1 2002a, content present on a mobile device 2000b is mapped to a least viewed channel 2 2002b, content present on a laptop 2000c is mapped to a PIP/multi-screen 2002c, and content present on a PC 2000d is mapped to a multimedia app 1 2002d.

Figure 20B:
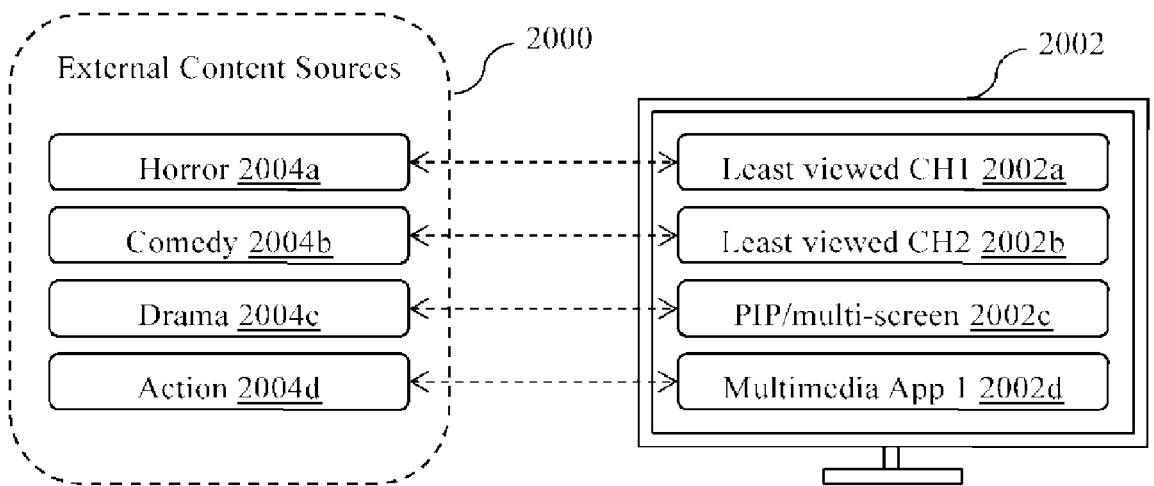

FIG. 20B illustrates genre to source mapping. In this type of mapping, the content is mapped based upon genre of content to TV source content, i.e., the content belonging to a particular genre is mapped to a particular DTV source. For example, horror genre 2004a is mapped to the least viewed channel 1 2002a, comedy genre 2004b is mapped to the least viewed channel 2 2002b, drama genre 2004c is mapped to the PIP/multi-screen 2002c, and action genre 2004d is mapped to the multimedia app 1 2002d.

Figure 20C:
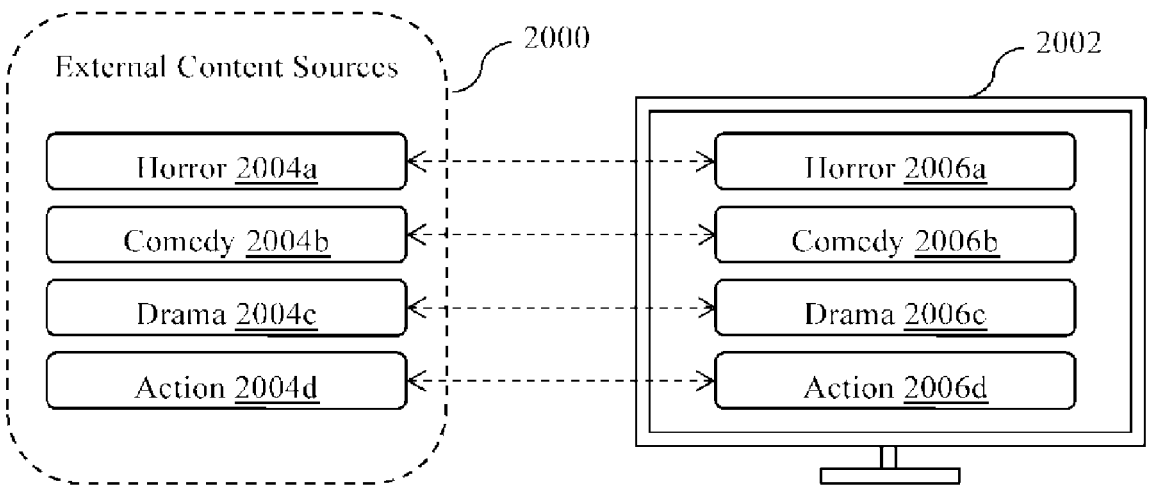
Figure 21:
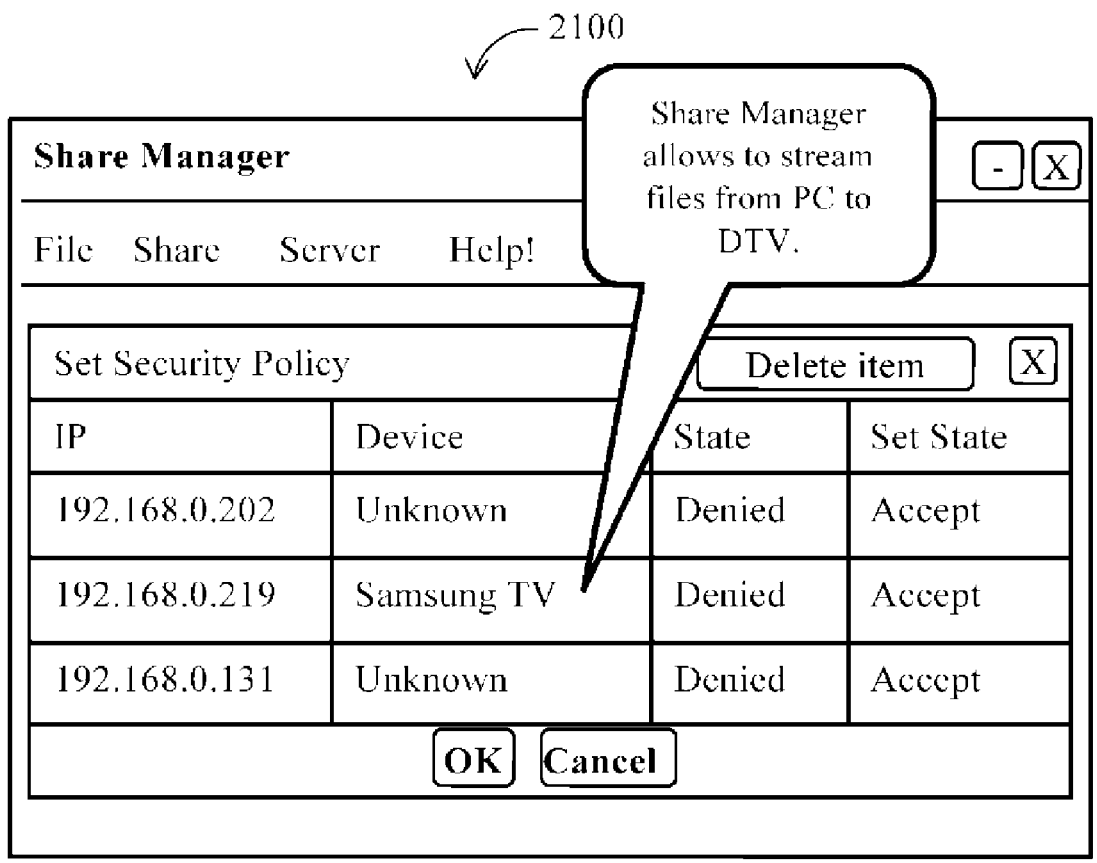
FIG. 21 illustrates the use of a computer application for content streamlining from external devices according to an exemplary embodiment of the present disclosure.

FIG. 20C illustrates genre to genre mapping: In this type of mapping, the content is mapped based upon genre of content to a genre in a broadcasting mode. If the user is currently browsing action movies in the broadcasting mode, action based external multimedia content is mapped to the least viewed channels in the action genre of the broadcasting mode. For example, the external content having horror genre 2004a is mapped to horror genre 2006a in the broadcasting mode, the external content having comedy genre 2004b is mapped to comedy genre 2006b in the broadcasting mode, the external content having drama genre 2004c is mapped to the drama genre 2006c in the broadcasting mode, and the external content having action genre 2004d is mapped to the action genre 2006d in the broadcasting mode.

Similarly, there can be many more ways of mapping external content to DTV sources based upon user interest.

Figure 22A:
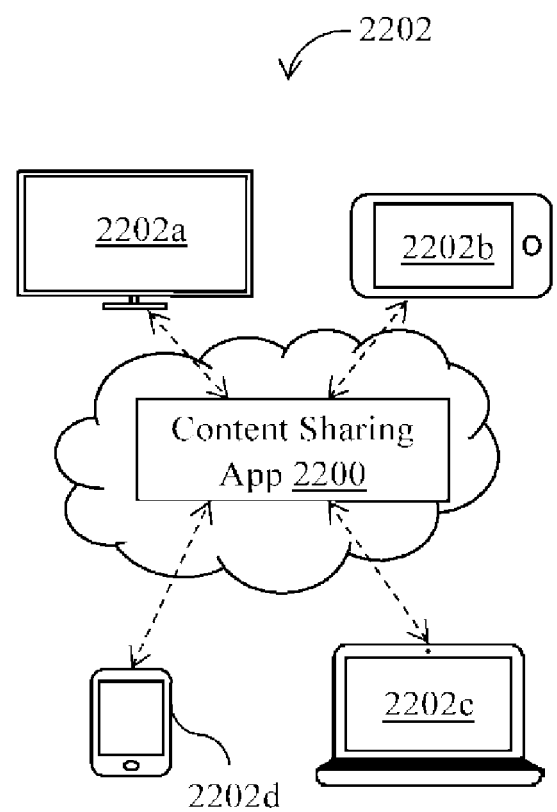
FIGS. 22A and 22B illustrate the use of a mobile application for content streamlining from external devices, according to an exemplary embodiment of the present disclosure.
Figure 22B:
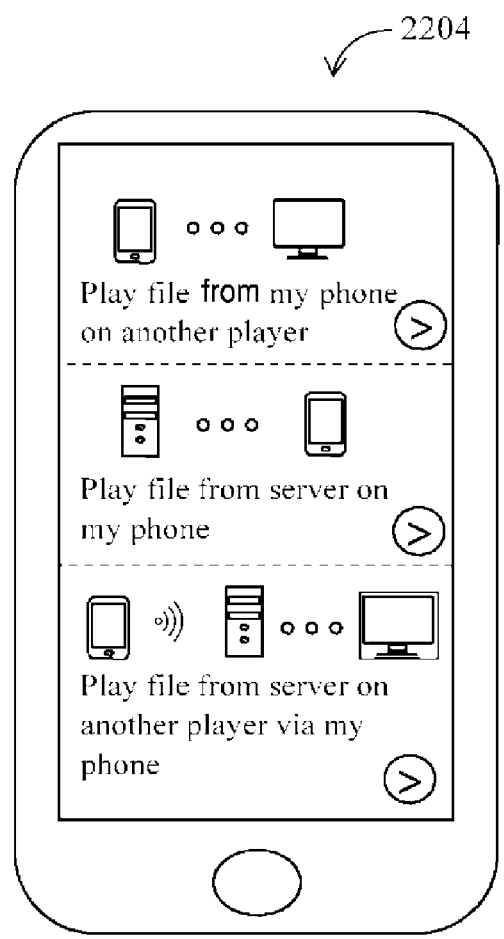

A lot of frameworks already exist which provide content streaming from the external devices to the TV. For example, a computer application named Share Manager 2100 (depicted in FIG. 21) can stream media on digital living network alliance (DLNA) devices. This computer application provides an efficient way to share content on a PC with a TV. The PC is an effective DLNA media server, which makes it possible to view most types of video files on the TV without any wires or cables. It also works with wired connections. Similarly, a content sharing app 2200 (depicted in FIG. 22A) allows an assortment of devices 2202, such as TV 2202a, tablets 2202b, laptops 2202c, phones 2202d, etc., to share their media output with one another. FIG. 22B illustrates a basic user interface 2204 for the content sharing app 2200. The content sharing app 2200 for Android can support 3 modes: playing media from the phone on another device, for example, a TV, computer, etc., playing media from another device on the phone, and connecting media from source 1 to source 2 by using the phone as a link.

Figure 23A:
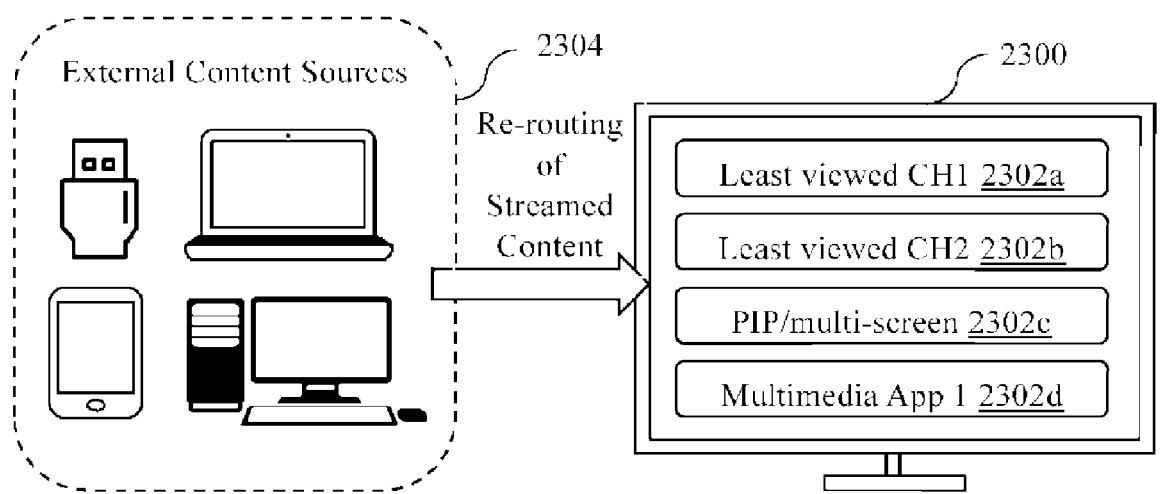
FIGS. 23A and 23B illustrate re-routing of streamed content and streaming of local content, according to an exemplary embodiment of the present disclosure.
Figure 23B:
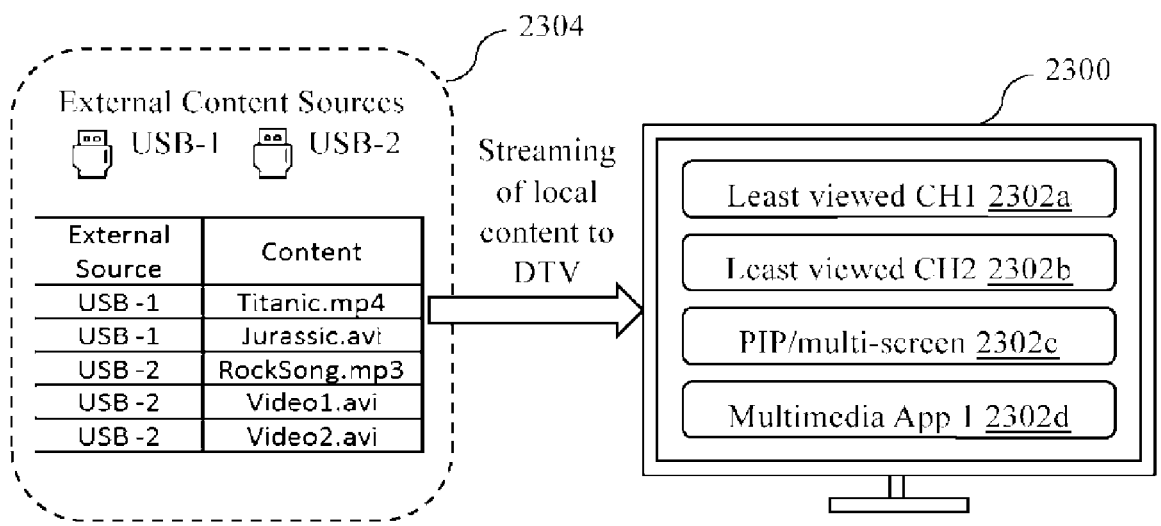

All these streaming frameworks have their own UI on the TV so the user may switch to the particular source to access the content which is streamed from the mobile or the PC. However, if content is stored on a USB device or external hard disk, there is no mechanism to stream this content from the connected USB/HDD to the TV. The user will switch to Media Play Source to access the content present on the TV. As shown in FIG. 23A, the present disclosure enables a TV 2300 to itself stream-in local content so that if any multimedia content is present on any connected external device 2304, such as the USB device or hard disk, no external device is used to act as a server for streaming content to its source modes 2302, such as least viewed channels 2302a and 2302b in the broadcasting mode, PIP/multi-screen 2302c in the PIP/multi-screen mode, and multimedia app 2302d in the application mode. In continuation to this, FIG. 23B illustrates an example, where two USB devices, USB-1 and USB-2, 2302, are connected to the TV 2300. The contents of USB-1 and USB-2 are mapped to the least viewed channels 2302a and 2302b in the broadcasting mode, the PIP/multi-screen 2302c in the PIP/multi-screen mode, and the multimedia app 2302d in the application mode.

Figure 24:
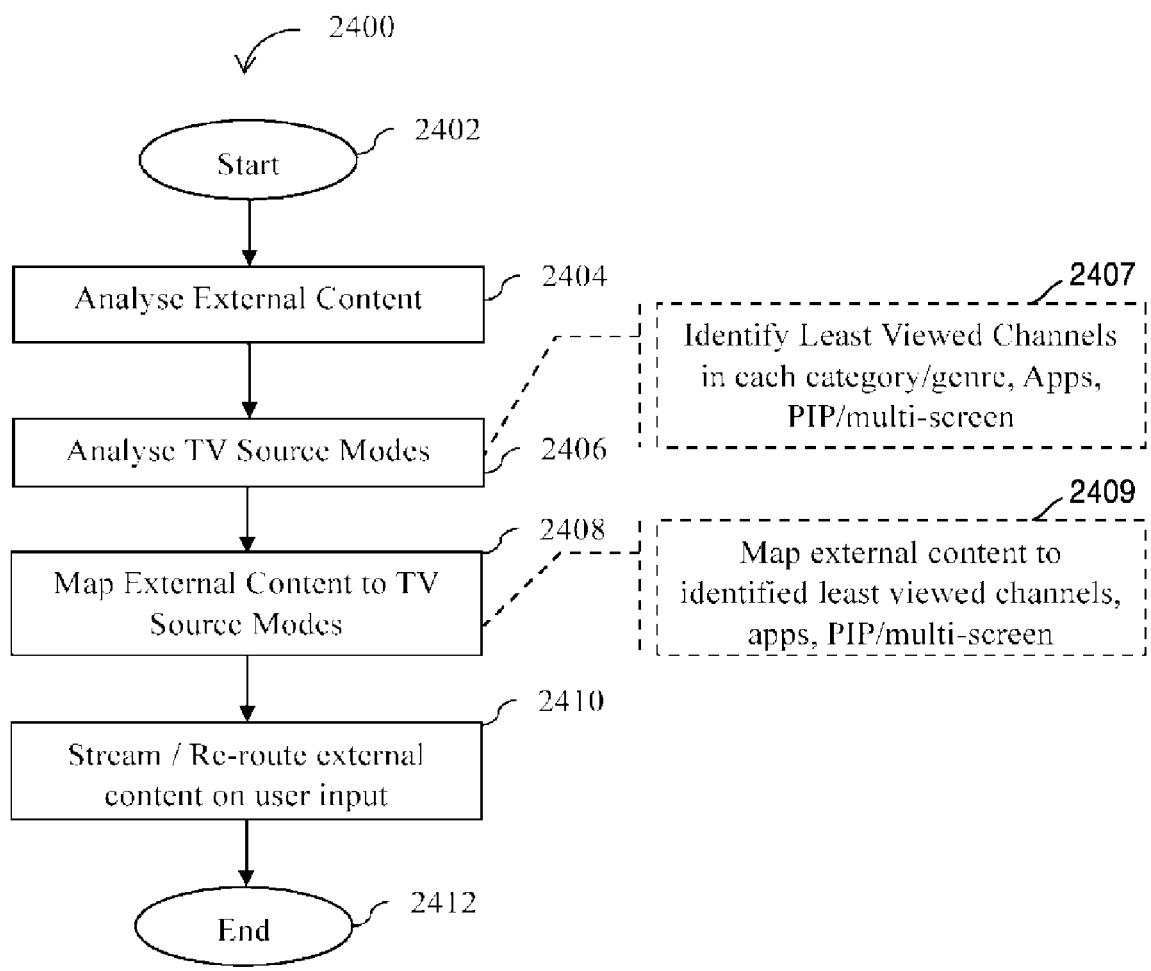
FIG. 24 illustrates a flowchart of a specific example of use of an exemplary embodiment of the present disclosure.

FIG. 24 illustrates a flowchart 2400 of another example of use of an embodiment of the present disclosure. The flowchart begins with operation 2404. In operation 2404, contents of the external sources are analysed to determine the values of at least one content parameter. In operation 2406, source modes of the TV are analysed to determine the value of the at least one content parameter. More specifically, least viewed broadcast channels in each category/genre, the multimedia apps, and the PIP/multi-screen are identified. In operation 2408, the analysed external content is mapped to the analysed source modes of the TV on the basis of the determined values of the at least one content parameter. Examples of the at least one content parameter include, but are not limited to genre, metadata, information derived from metadata, size, category, type, etc. More specifically, the external content is mapped to the identified least viewed channels, apps, and PIP/multi-screen. In operation 2410, the mapped external content is streamed or re-routed based on user input. In operation 2412, the process ends.

Figure 25:
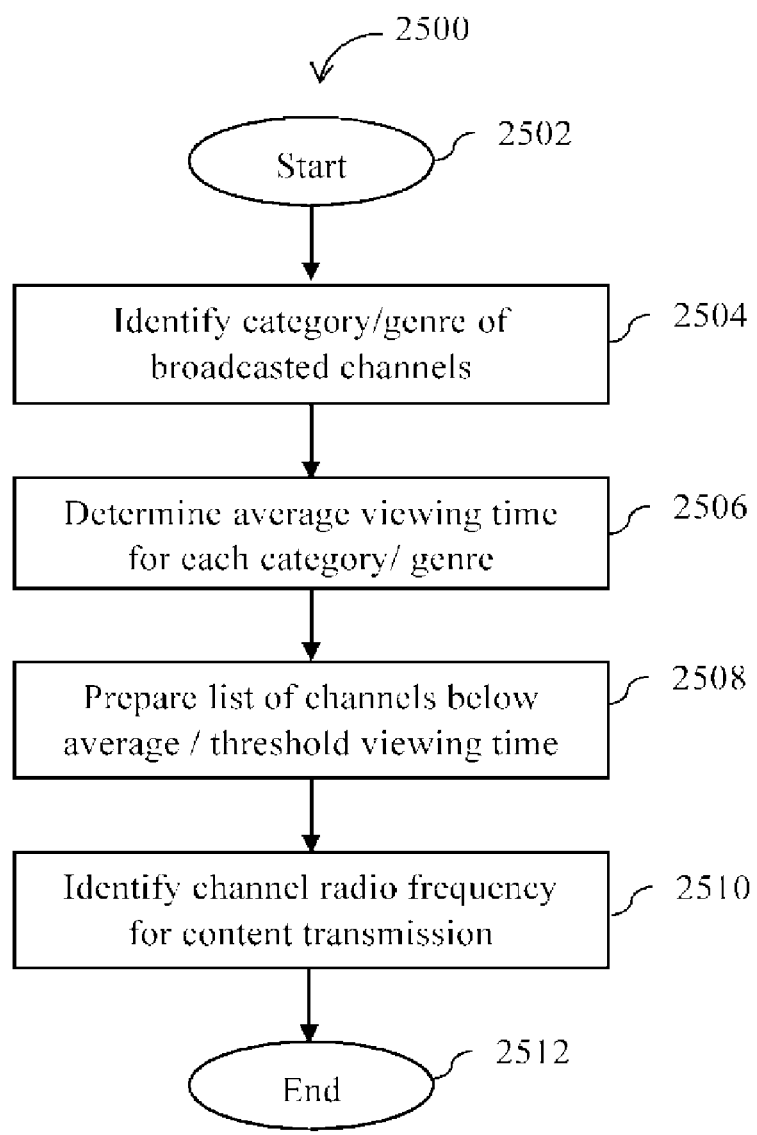
FIG. 25 illustrates a flowchart of analysis of broadcast content, according to an exemplary embodiment of the present disclosure.

FIG. 25 illustrates a flowchart 2500 of analysis of broadcast content, according to an exemplary embodiment of the present disclosure. The flowchart begins with operation 2502. In operation 2504, a category/genre of each of the broadcast channels is identified. In operation 2506, an average viewing time for each category/genre is determined. In operation 2508, a list of channels below the average/threshold viewing time is prepared. In operation 2510, a channel radio frequency is identified for content transmission. In operation 2512, the process ends.

Figure 26:
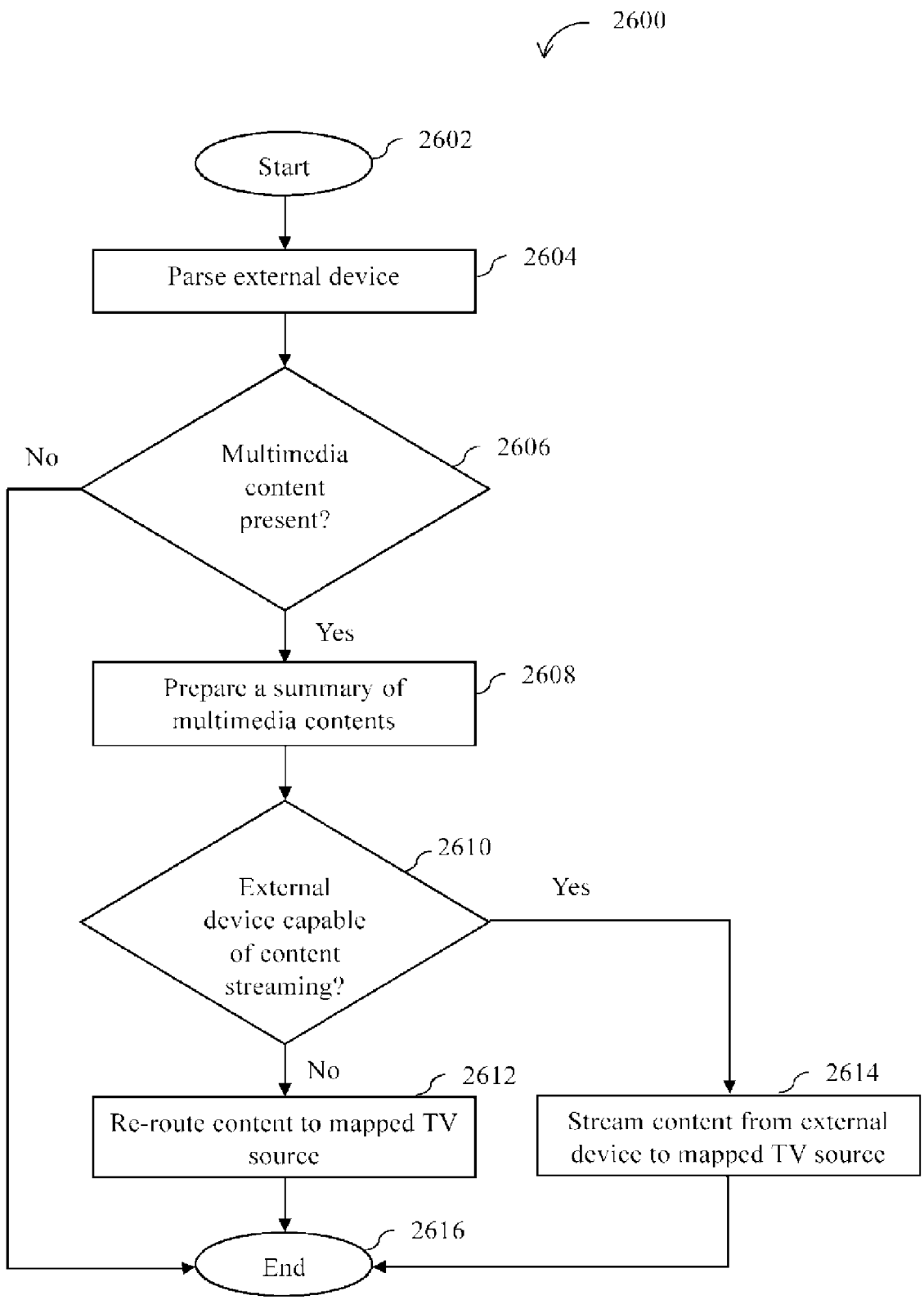
FIG. 26 illustrates a flowchart of analysis of external content, according to an exemplary embodiment of the present disclosure.

FIG. 26 illustrates a flowchart 2600 of analysis of the external content, according to an exemplary embodiment of the present disclosure. The flowchart begins with operation 2602. In operation 2604, the external device connected to the TV is parsed. In operation 2606, it is determined if multimedia content is present on the external device. If any multimedia content is not present on the external device, the flowchart ends. However, if the multimedia content is present on the external device, then a summary of the multimedia content is prepared in operation 2608 to detect content parameters. In operation 2610, it is checked if the external device is capable of content streaming. If the external device is not capable of content streaming, then the multimedia content is re-routed to a mapped source in operation 2612. However, if the external device is capable of content streaming, then the multimedia content is streamed to the mapped source in operation 2614. Thereafter, the process ends in operation 2616.

Some examples of use of the present disclosure are described below.

A first example of use is to provide a smart view mode, i.e., single screen for multiple sources. It is desired to provide a seamless viewing experience with respect to content present on multiple sources to the user. According to the present disclosure, the user can access all the content present on multiple sources in the smart view mode without the need to switch between the different sources. In the smart view mode, the user can access all the content present on the devices connected or paired with the TV in the single view mode so that the user can play any content from any source without the need to switch to that source. The user interface of the smart view mode can be dynamically modified if the list of the connected devices is overly large as well as if the number of playable content on each device is high. If such is the case, the user can be given an option to further categorize source types and connection types at a high level so that the user need not scroll through a large list of devices, as shown in Table 11 below.

TABLE 11

| Device Type | Device Name | Connectivity | Accessibility | Authentication Type |
|---|---|---|---|---|
| USB | USB-1 | Direct/Wired | Public | No authentication |
| | USB-2 | Direct/Wired | Public | No authentication |
| | USB-3 | Direct/Wired | Public | No authentication |
| Mobile | Mobile-1 | Wireless/Wi-Fi | Secured | Password |
| | Mobile-2 | Wired | Secured | Password |
| PC | PC-1 | Wireless/Wi-Fi | Secured | Password |
| | PC-2 | Wireless/Wi-Fi | Public | No authentication |
| Server/Cloud | Server-1 | Wireless | Secured | Password |

The user can be provided with various options to sort content in ascending or descending order by content size, content date, content duration, content name, etc. Similarly, the user can also be provided with various options to filter content by device type (PC/USB/mobile/etc.), media type (audio/video/etc.), connection type (secured/public/etc.), status (watched/unwatched/newly added/etc.), and so on. In this way, the user can easily access a huge amount of content present across devices.

Further, the present disclosure takes care of access to secured content across devices by providing restricted/secured access based upon content type. For this purpose, the user may put a limitation on access to content based upon privacy settings as shown in Table 12 below.

TABLE 12

| Content Genre | Accessibility | Authentication Type |
|---|---|---|
| Adult | Restricted/Locked | Authentication |
| Romance | Secured | Authentication |
| Action | Public | No authentication |
| Comedy | Public | No Authentication |
| Horror | Secured | Authentication |
| Drama | Public | No Authentication |
| Sports | Public | No authentication |
| Kids | Public | No Authentication |
| Personal Files | Locked | Authentication |

If the user has set access restrictions on certain kinds of contents present on shared devices, that content may be accessible only after a pre-defined authentication process, with which content may not be allowed to be played.

Additionally, supported file types can be displayed as shown in Table 13 below.

TABLE 13

| File Type | Playback Supported |
|---|---|
| .mp4 | Yes |
| .avi | Yes |
| .divx | No |
| .mpeg | Yes |
| .3gp | No |
| .jpeg | Yes |
| .gif | No |
| .png | No |
| .mp3 | Yes |

In this way, based upon device playback capabilities, the content can be filtered before being listed on the device so that the user is shown only content which the user can play.

Figure 27:
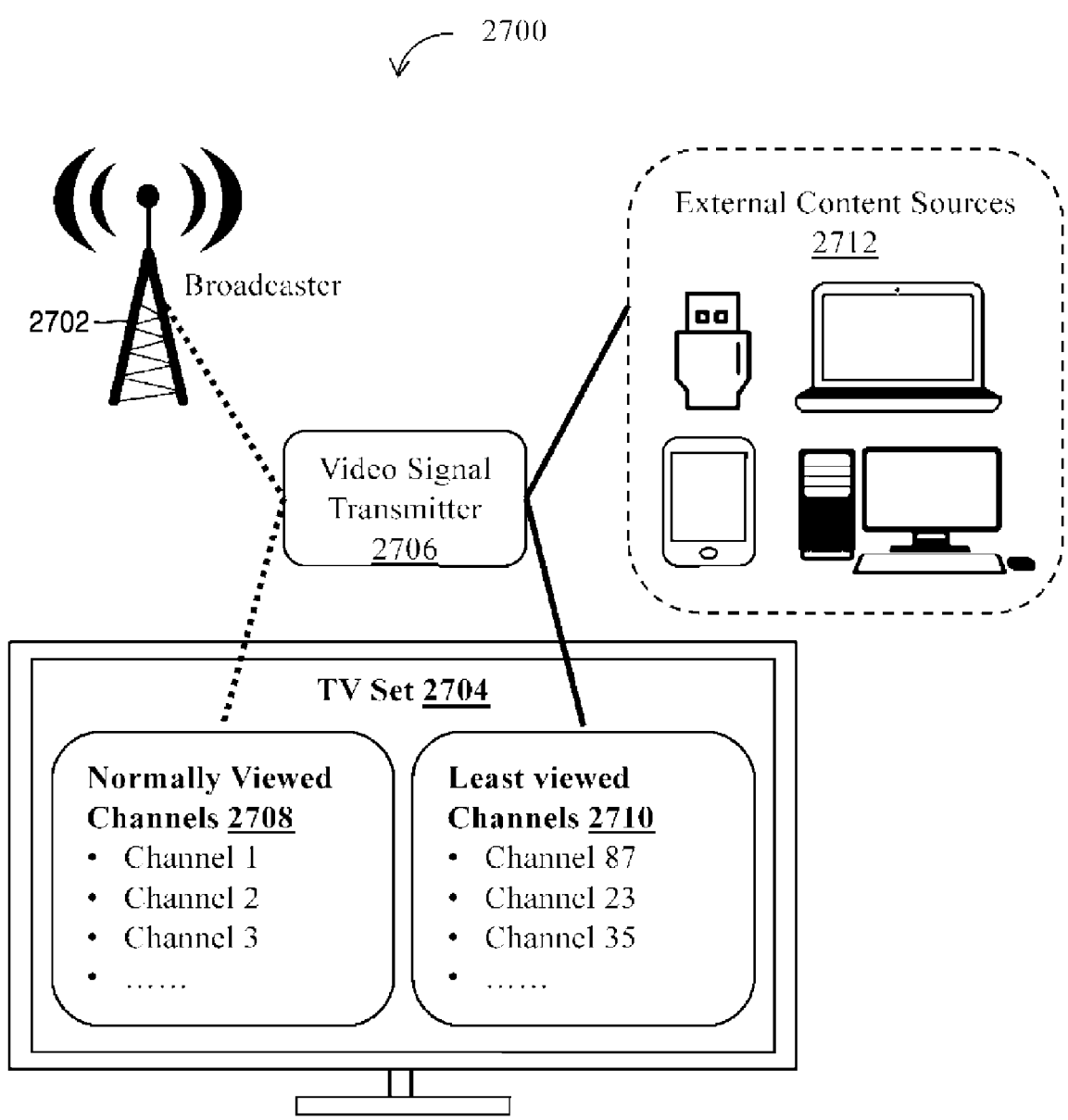
FIG. 27 illustrates a specific use case pertaining to mapping of local content to least viewed broadcast channels according to an exemplary embodiment of the present disclosure.

Another example of use 2700 of the present disclosure, as illustrated in FIG. 27, is to map local content to the least viewed broadcast channels. The TV is mostly used to watch broadcast content all the time. Therefore, if the user is comfortable using the user interface of the broadcast mode, there is no point making the user browse multiple user interfaces for multiple sources. By mapping the external content to the least viewed broadcast channels, the user is provided with a seamless viewing experience without any changes in his current viewing conditions. Referring to FIG. 27, the broadcaster 2702 broadcasts content to a TV 2704 through a video signal transmitter 2706. According to the present disclosure, normally viewed channels 2708 and least viewed channels 2710 are identified in the TV 2704. When any of the external content sources 2712 are connected to the TV 2704, their content are automatically mapped to the least viewed channels 2710, according to the present disclosure.

Another example of use of the present disclosure is to map local content to multimedia apps. In the case of emerging smart TVs, users can access all the external content through mapping of the multimedia enabled apps to local content. In this way, the users can play local content directly from the apps which support multimedia playback.

Another example of use of the present disclosure is to map local content to PIPs. The PIPs are accessible on almost every screen of the TV, be it broadcasting, application mode, multi-screen, etc. Streaming external content on the PIP can be a simple way of accessing the external content.

Another example of use of the present disclosure is to stream local content to virtual apps. A multimedia playback framework exists in the TVs, whenever any external content is detected on any paired device, this external content can be played via a multimedia widget dedicated to playing external multimedia content.

Another example of use of the present disclosure is to stream local content to appended channels. There are many channel slots available in the TV, which are completely unused and no broadcast channel signal is mapped to them. These channel slots can be reused by mapping local content to the channels as described above.

Another example of use of the present disclosure is mapping of external devices to TV modes. Dedicated mapping of a device to a TV source is very useful because it can help users as they do not have to remember many different mappings. A content list may gradually become huge and it becomes difficult for the users to remember which content is mapped to which TV mode. Hence, by mapping devices to a particular channel or application, it helps the users to remember easily.

Another example of use of the present disclosure is mapping of genre based content to TV modes. Categorization of external content and providing category based mapping of the external content to the TV modes helps users to access the same genre content in the same screen from across multiple sources.

Those of ordinary skill in the art will appreciate that the present disclosure can be implemented using parallel execution of modules in different threads. Further, the present disclosure can be implemented using local as well as cloud servers for analysing external contents. The databases can be stored on the user device, paired devices, as well as cloud servers. The steaming mechanism can also be implemented on the paired devices. The present disclosure can be applied to different devices with different user interface setups.

While the present disclosure has been shown and described with reference to various example embodiments thereof, it will be understood by those of ordinary skill in the art that various changes in form and details may be made therein without departing from the scope of the present disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A content processing device comprising:
   a processor configured to:
   map contents of a plurality of external content sources to a content listing in a broadcasting mode of the content processing device, based on at least one content parameter comprising a frequency of viewing channels, wherein the broadcasting mode enables the content processing device to broadcast at least one TV channels;
   present an icon array of a modified content listing in the identified source broadcasting mode, the icon array of the modified content listing comprising a plurality of content icons, each icon representing one of the contents of the plurality of external content sources according to the broadcasting mode of the content processing device; and
   reproduce the one of the contents of the plurality of external content sources in response to a selection of one of the icon array of the modified content listing in the broadcasting mode and without explicitly switching to an external content source mode,
   wherein the mapping of the contents of the plurality of external content sources to the content listing comprises mapping, based on the frequency of viewing channels, the contents of the plurality of external content sources to empty or least viewed channels in the content listing in the broadcasting mode of the content processing device.

2. The content processing device of claim 1, wherein the plurality of external content sources comprises two or more of a universal serial bus (USB) device, a high-definition multimedia interface (HDMI) device, a mobile device, a tablet device, a personal computer (PC), a laptop, a storage device, a wirelessly connected device, a set top box, or a broadcasting system.

3. The content processing device of claim 1, wherein the content listing comprises at least one of: an electronic program guide (EPG), an interactive program guide (IPG), a television (TV) guide, a browsing menu, or a TV menu, and wherein the at least one content parameter comprises at least one of: a genre, metadata, information derived from the metadata, size, category, or type of the contents.

4. The content processing device of claim 1, wherein the processor is further configured to, when the content processing device is in an application mode, identify multimedia applications or widgets, and
   wherein the processor is further configured to map the contents of the plurality of external content sources to the identified multimedia applications or widgets within the content listing, based on the at least one content parameter.

5. The content processing device of claim 1, wherein the processor is further configured to:
   when the content processing device is in a picture in picture (PIP) mode, identify at least one PIP window, wherein the processor is further configured to map the contents of the plurality of external content sources to the at least one PIP window in the PIP mode, based on the at least one content parameter; and
   when the content processing device is in a multi-screen mode, identify at least one screen, wherein the processor is further configured to map the contents of the plurality of external content sources to the at least one screen in the multi-screen mode, based on the at least one content parameter.

6. The content processing device of claim 1, wherein the modified content listing is generated by performing at least one of:
   adding a new content in the content listing,
   replacing a least viewed content from the content listing with a new content,
   appending a new content in the content listing, or
   replacing an unavailable content from the content listing with a new content.

7. The content processing device of claim 1, wherein the processor is further configured to present the modified content listing in a smart view listing of all the contents of the plurality of external content sources in a single view such that content can be selected from an external content source without explicitly switching to the external content source.

8. A method performed using a content processing device, the method comprising:
   mapping contents of a plurality of external content sources to a content listing in a broadcasting mode of the content processing device, based on at least one content parameter comprising a frequency of viewing channels, wherein the broadcasting mode enables the content processing device to broadcast at least one TV channels;
   displaying an icon array of a modified content listing of the identified source in the broadcasting mode, the icon array of the modified listing comprising a plurality of content icons, each icon representing one of the contents of the plurality of external content sources according to the broadcasting mode of the content processing device; and
   reproducing the one of the contents of the plurality of external content sources in response to a selection of one of the icon array of the modified content listing in the broadcasting mode and without explicitly switching to an external content source mode,
   wherein the mapping of the contents of the plurality of external content sources to the content listing comprises mapping, based on the frequency of viewing channels, the contents of the plurality of external content sources to unused or least viewed channels in the content listing in the broadcasting mode of the content processing device.

9. The method of claim 8, wherein the plurality of external content sources comprises two or more of:
   a USB device,
   a HDMI device,
   a mobile device,
   a tablet device,
   a PC,
   a laptop,
   a storage device,
   a wirelessly connected device,
   a set top box, and
   a broadcasting system.

10. The method of claim 8, wherein the content listing comprises at least one of an electronic program guide (EPG), an interactive program guide (IPG), a TV Guide, a browsing menu, or a TV menu, and wherein the at least one content parameter comprises at least one of:
    a genre,
    metadata,
    information derived from the metadata, size,
category, or
type of the contents.

11. The method of claim 8, further comprising:
when the content processing device is in an application mode, identifying multimedia applications or widgets and mapping the contents of the plurality of external content sources to the identified multimedia applications or widgets within the content listing, based on the at least one content parameter.

12. The method of claim 8, further comprising:
when the content processing device is in a picture in picture (PIP) mode, identifying at least one PIP window and mapping the contents of the plurality of external content sources to the at least one PIP window in the PIP mode, based on the at least one content parameter; and
when the content processing device is in a multi-screen mode, identifying at least one screen and mapping the contents of the plurality of external content sources to the at least one screen in the multi-screen mode, based on the at least one content parameter.

13. The method of claim 8, wherein the modified content listing is generated by performing at least one of:
adding a new content in the content listing,
replacing a least viewed content from the content listing with a new content,
appending a new content in the content listing, or
replacing a unavailable content from the content listing with a new content.

14. The method of claim 8, wherein the displaying comprises presenting the modified content listing in a smart view listing of all the contents of the plurality of external content sources in a single view such that content can be selected from an external content source without explicitly switching to the external content source.

15. A content processing device comprising:
a processor configured to:
cause user interface configured to display an icon array of a content listing in a broadcasting mode of the content processing device, the icon array of the content listing comprising a plurality of content icons, each icon representing one of contents of a plurality of external content sources according to the broadcasting mode of the content processing device, wherein the broadcasting mode enables the content processing device to broadcast at least one TV channels and wherein the content listing displays mapping of the content of the external content sources to unused or least viewed channels in the content listing in the broadcast mode of the content processing device based on a frequency of viewing channels;
receive a selected content from one of the contents of the plurality of external content sources in the content listing;
determine an external content source hosting the selected content; and
play the selected content from the external content source in the broadcasting mode without explicitly switching to the external content source mode.

16. The content processing device of claim 15, wherein the selected content is streamed from the external content source in the broadcasting mode of the content processing device.

17. The content processing device of claim 15, wherein the processor is further configured to control:
an external content analyser to analyse contents of a plurality of external content sources; and
a source mode analyser to analyse one or more source modes of the content processing device.

18. The content processing device of claim 17, wherein the processor is further configured to:
map the contents of the plurality of external content sources to a content listing in the broadcasting mode of the content processing device, based on at least one content parameter, and wherein the user interface is further configured to:
present a modified content listing of the broadcasting mode, the modified listing comprising mappings of the contents of the plurality of external content sources to the content listing in the broadcasting mode of the content processing device.

* * * * *